US012803221B2

(12) United States Patent
Ishikawa et al.

(10) Patent No.: US 12,803,221 B2
(45) Date of Patent: Nov. 17, 2026

(54) LEVER-TYPE FITTING CONNECTOR

(71) Applicant: YAZAKI CORPORATION, Tokyo (JP)

(72) Inventors: Yoshinori Ishikawa, Makinohara (JP); Kenta Suzuki, Tokyo (JP)

(73) Assignee: YAZAKI CORPORATION, Tokyo (JP)

( * ) Notice: Subject to any disclaimer, the term of this patent is extended or adjusted under 35 U.S.C. 154(b) by 400 days.

(21) Appl. No.: 18/600,432

(22) Filed: Mar. 8, 2024

(65) Prior Publication Data

US 2024/0356283 A1 Oct. 24, 2024

(30) Foreign Application Priority Data

Apr. 19, 2023 (JP) ................................ 2023-068347

(51) Int. Cl.
*H01R 13/629* (2006.01)

(52) U.S. Cl.
CPC .............................. *H01R 13/62955* (2013.01)

(58) Field of Classification Search
CPC ................................................ H01R 13/62955
See application file for complete search history.

(56) References Cited

U.S. PATENT DOCUMENTS 6,409,525 B1 * 6/2002 Hoelscher ............ H01R 13/631 439/378
6,422,881 B1 * 7/2002 Puhl ................... H01R 13/4538 439/140
6,644,992 B2 * 11/2003 Maegawa .......... H01R 13/4538 439/157
6,761,568 B2 * 7/2004 Bakker .............. H01R 13/4538 439/140
7,588,455 B2 * 9/2009 Matsumura .......... H01R 13/631 439/357
7,670,177 B2 * 3/2010 Myer ................. H01R 13/4365 439/595
8,002,570 B2 * 8/2011 Matsumura .......... H01R 13/631 439/352
8,926,344 B2 * 1/2015 Jozwiak ................. H01R 24/66 439/140
9,509,081 B2 * 11/2016 Kobayashi ........... H01R 13/502
10,236,629 B2 * 3/2019 Narro .................... H01R 13/518
10,535,952 B2 * 1/2020 Mamiya ............. H01R 13/4538
10,644,446 B2 5/2020 Yasuda et al.
(Continued)

FOREIGN PATENT DOCUMENTS

JP 2019-91610 A 6/2019
JP 2019-96535 A 6/2019
(Continued)

*Primary Examiner* — Thanh Tam T Le
(74) *Attorney, Agent, or Firm* — KENEALY VAIDYA LLP

(57) ABSTRACT

A lever member is turned from a first lever position toward a second lever position to cause a connector fitting force to act between a male frame member and a female connector, flexurally deform a plate locking body with input from the female connector brought close to the male frame member with the connector fitting force to release a locked state of a plate by the plate locking body, and push and relatively move a hood member in a first hood position toward a second hood position with input from the female connector.

4 Claims, 21 Drawing Sheets

(56) References Cited

U.S. PATENT DOCUMENTS

| | | | | |
|---|---|---|---|---|
| 10,707,616 | B2 | 7/2020 | Kosaka et al. | |
| 2002/0168895 | A1* | 11/2002 | Suzuki ............... | H01R 13/4365 439/752 |
| 2010/0105254 | A1* | 4/2010 | Park ................... | H01R 13/4538 439/752 |
| 2022/0158392 | A1 | 5/2022 | Nozaki et al. | |

FOREIGN PATENT DOCUMENTS

| | | | |
|---|---|---|---|
| JP | 2019-212521 | A | 12/2019 |
| JP | 2020-149869 | A | 9/2020 |
| JP | 2021-157971 | A | 10/2021 |

* cited by examiner

LEVER-TYPE FITTING CONNECTOR

CROSS-REFERENCE TO RELATED APPLICATION(S)

The present application claims priority to and incorporates by reference the entire contents of Japanese Patent Application No. 2023-068347 filed in Japan on Apr. 19, 2023.

BACKGROUND OF THE INVENTION

1. Field of the Invention

The present invention relates to a fitting connector.

2. Description of the Related Art

As a fitting connector, there has been a connector in which an insertion and removal assisting structure for generating a fitting assisting force required for increasing a fitting force in an interconnector or a removal assisting force required for increasing a removal force in the interconnector is provided in any one of two connectors. For example, as one connector with the insertion and removal assisting structure, a lever-type connector including a lever member (so-called LIF lever) as the insertion and removal assisting structure is known. In the fitting connector, by turning the lever member from a first lever position at the time when a space between the lever-type connector and the other mating connector (the interconnector) is in an insertable and removable state to a second lever position at the time when the interconnector is in a fitting completed state, a connector fitting force is generated between the lever-type connector and the fitting connector, and the lever-type connector and the mating connector are attracted to each other to be fitted and connected. In the fitting connector, by turning the lever member from the second lever position to the first lever position, a connector removal force is generated between the lever-type connector and the mating connector, and the fitting completed state is released while the lever-type connector and the fitting connector being separated from each other. When the lever-type connector and the mating connector are in the insertable and removable state, the lever-type connector and the mating connector become unable to be energized, and the lever-type connector and the mating connector can start to be fitted and connected to change to the fitting completed state or the lever-type connector and the mating connector can be separated. When the lever-type connector and the mating connector are in the fitting completed state, the lever-type connector and the mating connector become able to be energized.

The lever-type connector includes a tubular hood portion in which the mating connector is fitted when the lever-type connector is in the fitting completed state with the mating connector and in which a mating terminal fitting of the mating connector is fitted and connected to a terminal fitting in a tube. In the lever-type connector, the terminal fitting is retracted from the tube of the hood portion when the lever-type connector is in the insertable and removable state with the mating connector. The lever-type connector includes a plate that suppresses protrusion of the terminal fitting into the tube of the hood portion when the lever-type connector is in the insertable and removable state with the mating connector and increases a protrusion amount of the terminal fitting into the tube of the hood portion when the lever-type connector is in the fitting completed state with the mating connector. In the lever-type connector, by relatively moving the plate with respect to a terminal holding portion, which holds the terminal fitting, in association with the movement of the lever member, the protrusion amount of the terminal fitting from a through-hole of the plate into the tube of the hood portion is adjusted.

This type of fitting connector is disclosed in, for example, Japanese Patent Application Laid-open No. 2019-091610, Japanese Patent Application Laid-open No. 2019-212521, Japanese Patent Application Laid-open No. 2020-149869, Japanese Patent Application Laid-open No. 2021-157971, and Japanese Patent Application Laid-open No. 2019 096535. In the lever-type connectors described in Japanese Patent Application Laid-open No. 2019-091610, Japanese Patent Application Laid-open No. 2019-212521, Japanese Patent Application Laid-open No. 2020-149869, and Japanese Patent Application Laid-open No. 2021-157971, the plate is relatively moved with respect to a housing in which the terminal holding portion and the hood portion are integrated. On the other hand, in the lever-type connector described in Japanese Patent Application Laid-open No. 2019 096535, a member in which the hood portion and the plate are integrated is relatively moved with respect to the terminal holding portion.

Incidentally, in the fitting connector of the related art, in a single body state in which the lever-type connector and the mating connector are separated from each other, it is necessary to protect the tip of the terminal fitting of the lever-type connector from peripheral components and the like. Here, the terminal protection function is carried by the plate of the lever-type connector. Therefore, in the fitting connector, even if a turning operation of the lever member is repeated, it is necessary to relatively move the plate to an appropriate position in association with the movement of the lever member.

SUMMARY OF THE INVENTION

Therefore, an object of the present invention is to provide a fitting connector capable of maintaining a relative movement function of a plate.

A fitting connector according to one aspect of the present invention includes a male connector and a female connector that relatively move an interconnector between an insertable and removable position and a fitting completed position according to a turning operation of a lever member, wherein the male connector includes a male terminal metal fitting, a male frame member that houses the male terminal metal fitting while keeping a male terminal connecting portion protruded, a tubular hood member including a tubular hood portion that relatively moves the female connector in a tube axis direction between the insertable and removable position and the fitting completed position in a tube, including a tubular frame housing portion that relatively moves the female connector in the tube axis direction between a first hood position in the insertable and removable position and a second hood position in the fitting completed position with respect to the male frame member housed in a tube, and including a plate disposed in a boundary between the hood portion and the frame housing portion, and a lever member that is capable of turning around an axis of a rotating shaft between the lever member and the male frame member and causes a connector fitting force or a connector removal force involved in the turning to act between the lever member and the female connector, the plate includes a terminal insertion hole that allows a distal end of the male terminal connecting portion to enter the hood portion in the first hood position and increases a protrusion amount of the male terminal connecting portion in the hood portion to be larger in the second hood position than in the first hood position, the male frame member is provided with, in a plurality of parts, plate locking bodies having flexibility for locking the plate in the first hood position, the plate locking body includes a first plate locking protrusion and a second plate locking protrusion that sandwich an end portion of the plate in a plate thickness direction thereof when the hood member is in the first hood position, and the lever member is turned in one direction around the axis of the rotating shaft with respect to the male frame member from a first lever position in the insertable and removable position toward a second lever position in the fitting completed position to cause the connector fitting force to act between the male frame member and the female connector, flexurally deform the plate locking body with input from the female connector brought close to the male frame member by the connector fitting force to release a locked state of the plate by the plate locking body, and push and relatively move the hood member in the first hood position toward the second hood position with the input from the female connector, and, on the other hand, is turned in another direction from the second lever position toward the first lever position around the axis of the rotating shaft with respect to the male frame member to cause the connector removal force to act between the male frame member and the female connector, flexurally deform the plate locking body with the input from the female connector pulled apart from the male frame member by the connector removal force, and relatively move the hood member in the second hood position toward the first hood position with the input from the female connector.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
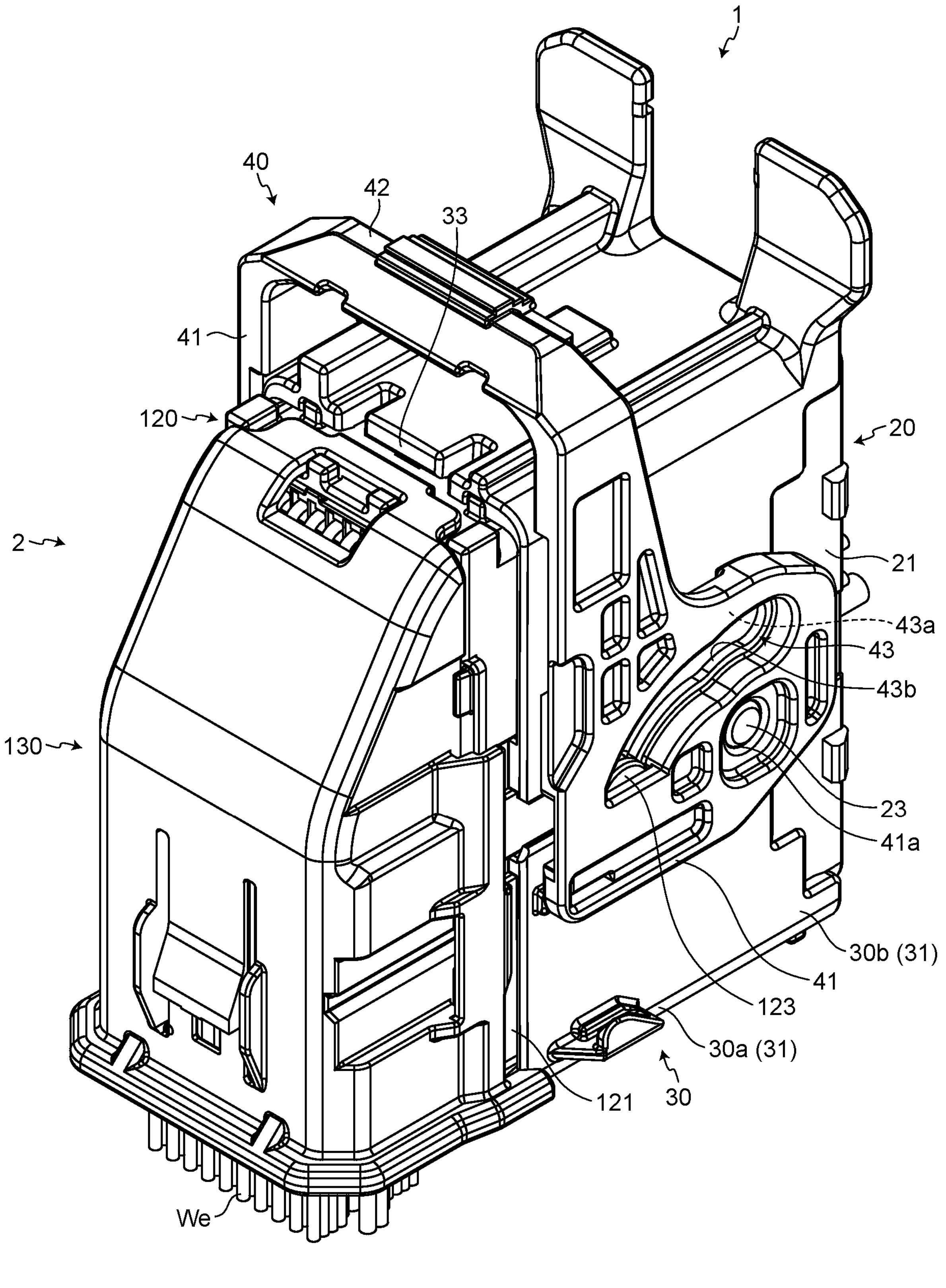
FIG. 1 is a perspective view illustrating a fitting connector in an insertable and removable position (a first lever position) in an embodiment.

An embodiment of a fitting connector according to the present invention is explained in detail below with reference to the drawings. Note that the present invention is not limited by the embodiment.

Embodiment

One of embodiments of a fitting connector according to the present invention is explained with reference to FIG. 1 to FIG. 22.

Reference numerals 1 and 2 in FIG. 1 to FIG. 7 respectively denote a male connector and a female connector configuring the fitting connector in the present embodiment. One of the male connector 1 and the female connector 2 is a lever-type connector and relatively moves a space between the male connector 1 and the female connector 2 (hereinafter referred to as "interconnector") between an insertable and removable position (FIG. 1 and FIG. 2) and a fitting completed position (FIG. 3 and FIG. 4) according to a turning operation of a lever member explained below. Here, the male connector 1 is configured as the lever-type connector.

The male connector 1 and the female connector 2 are electrically connected to each other when the interconnector is in a fitting completed state (a fitting completed position) and are electrically disconnected from each other when the interconnector is in an insertable and removable state (an insertable and removable position) in which the interconnector is in a fittable state and a removable state. In the male connector 1 and the female connector 2, when the interconnector is in the insertable and removable position, a lever member explained below is turned to generate a connector fitting force in the interconnector in the insertable and removable position, whereby the interconnector is fitted and connected while being relatively moved to the fitting completed position. In the male connector 1 and the female connector 2, when the interconnector is in the fitting completed position, the lever member is turned to generate a connector removal force in the interconnector in the fitting completed position, whereby the interconnector is relatively moved to the insertable and removable position. The male connector 1 and the female connector 2 can be pulled apart and separated from each other in the insertable and removable position.

The male connector 1 includes a male terminal metal fitting 10, a male frame member 20 that houses the male terminal metal fitting 10, and a tubular hood member 30 that houses the female connector 2 and houses the male frame member 20 (FIG. 1 to FIG. 8). The female connector 2 includes a female terminal metal fitting 110, a female frame member 120 that houses the female terminal metal fitting 110, and a female cover member 130 that covers the female frame member 120 (FIG. 1 to FIG. 7 and FIG. 9).

Figure 6:
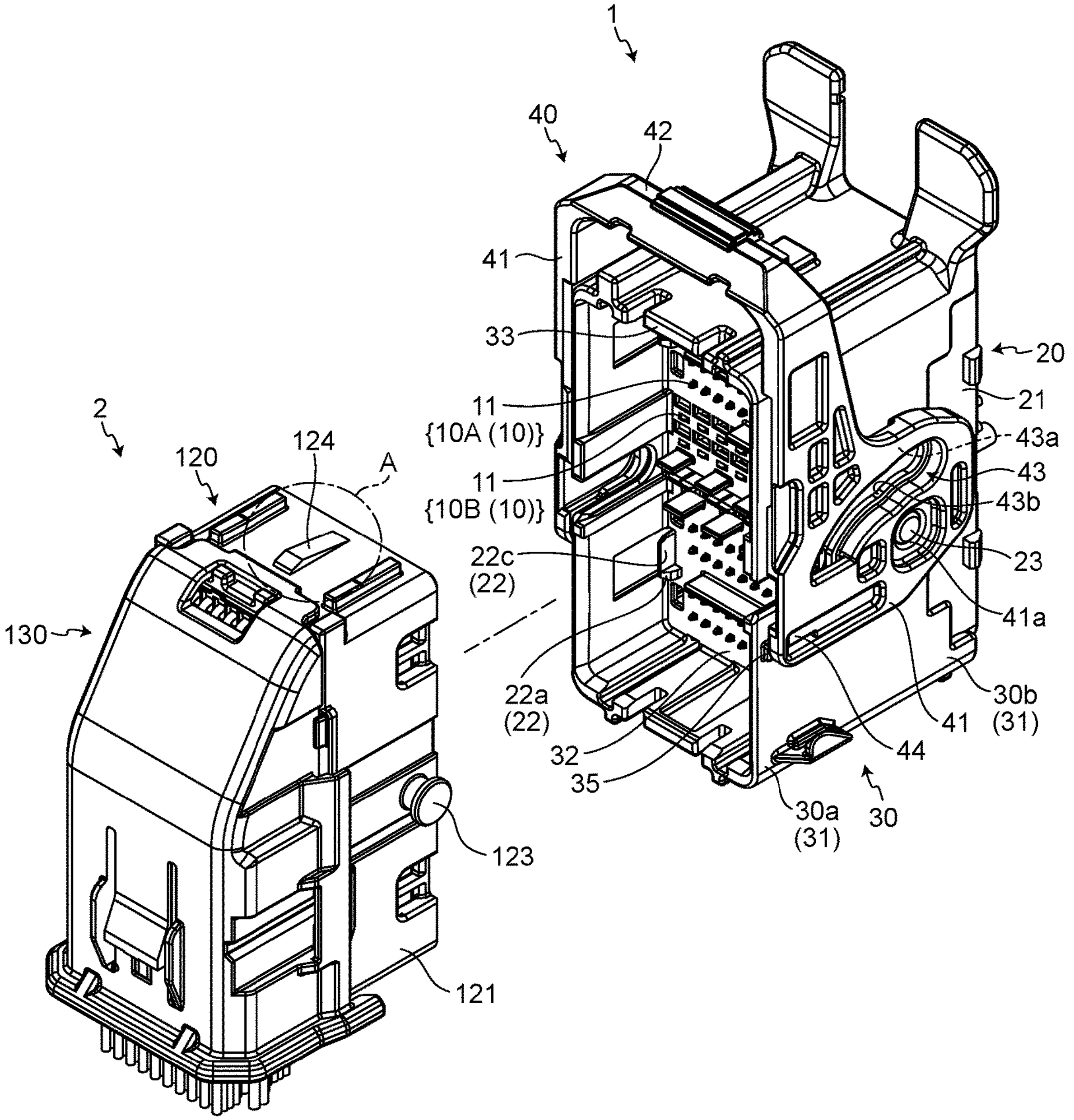
FIG. 6 is a perspective view illustrating the fitting connector in the embodiment before connector fitting connection.
Figure 7:
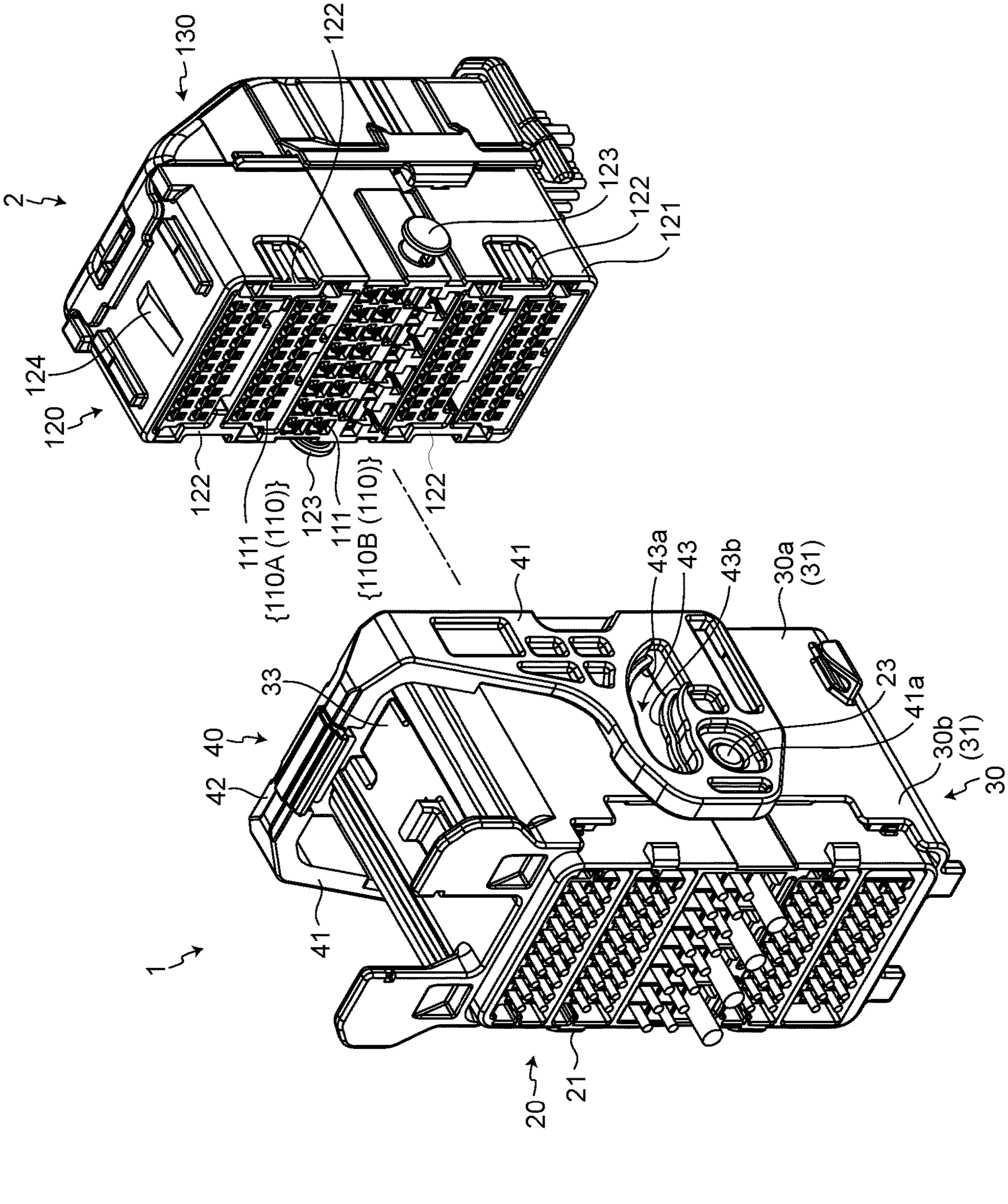
FIG. 7 is a perspective view of the fitting connector in the embodiment before connector fitting connection viewed from another angle.
Figure 8:
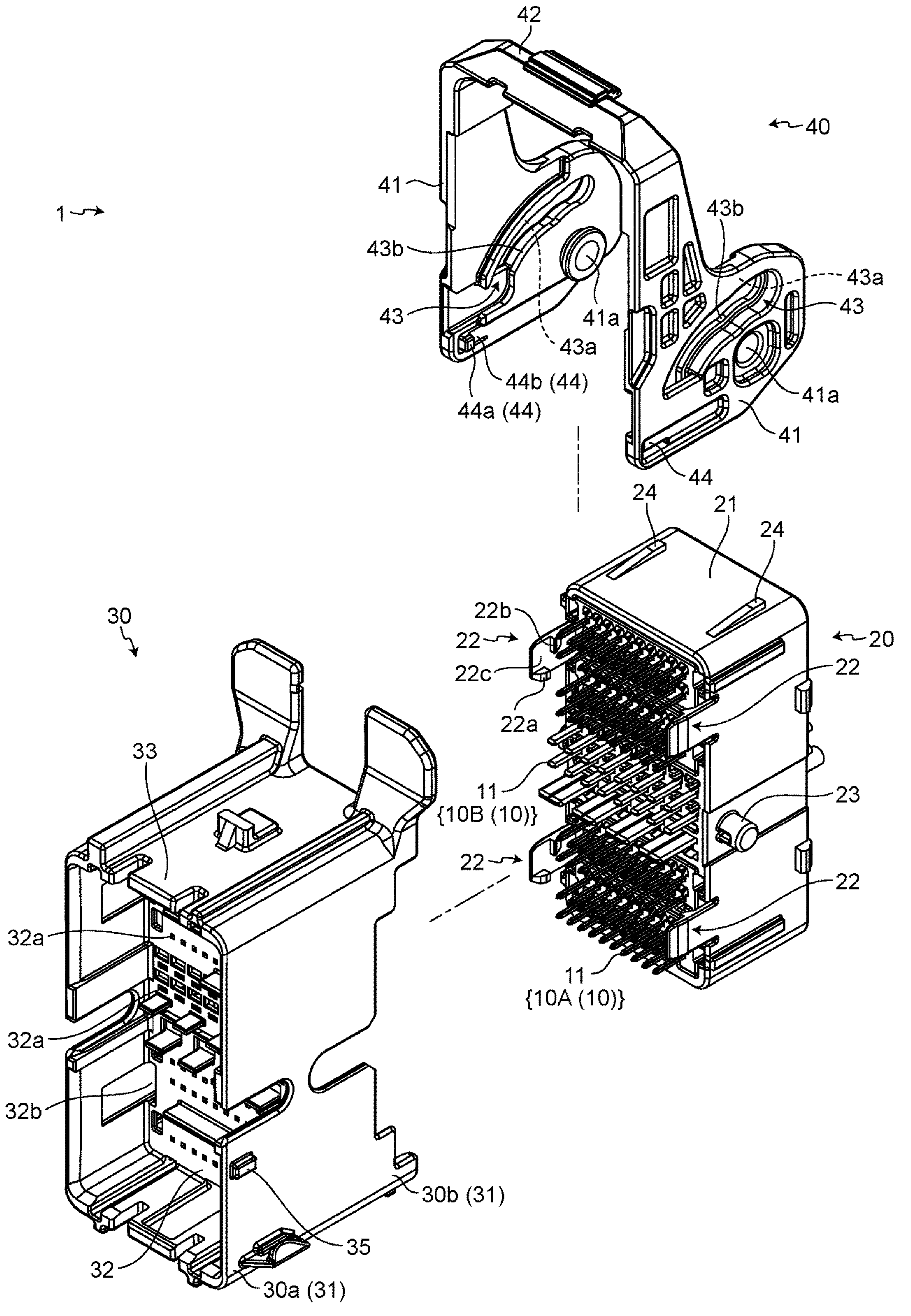
FIG. 8 is an exploded perspective view of a male connector divided for each of main components.
Figure 9:
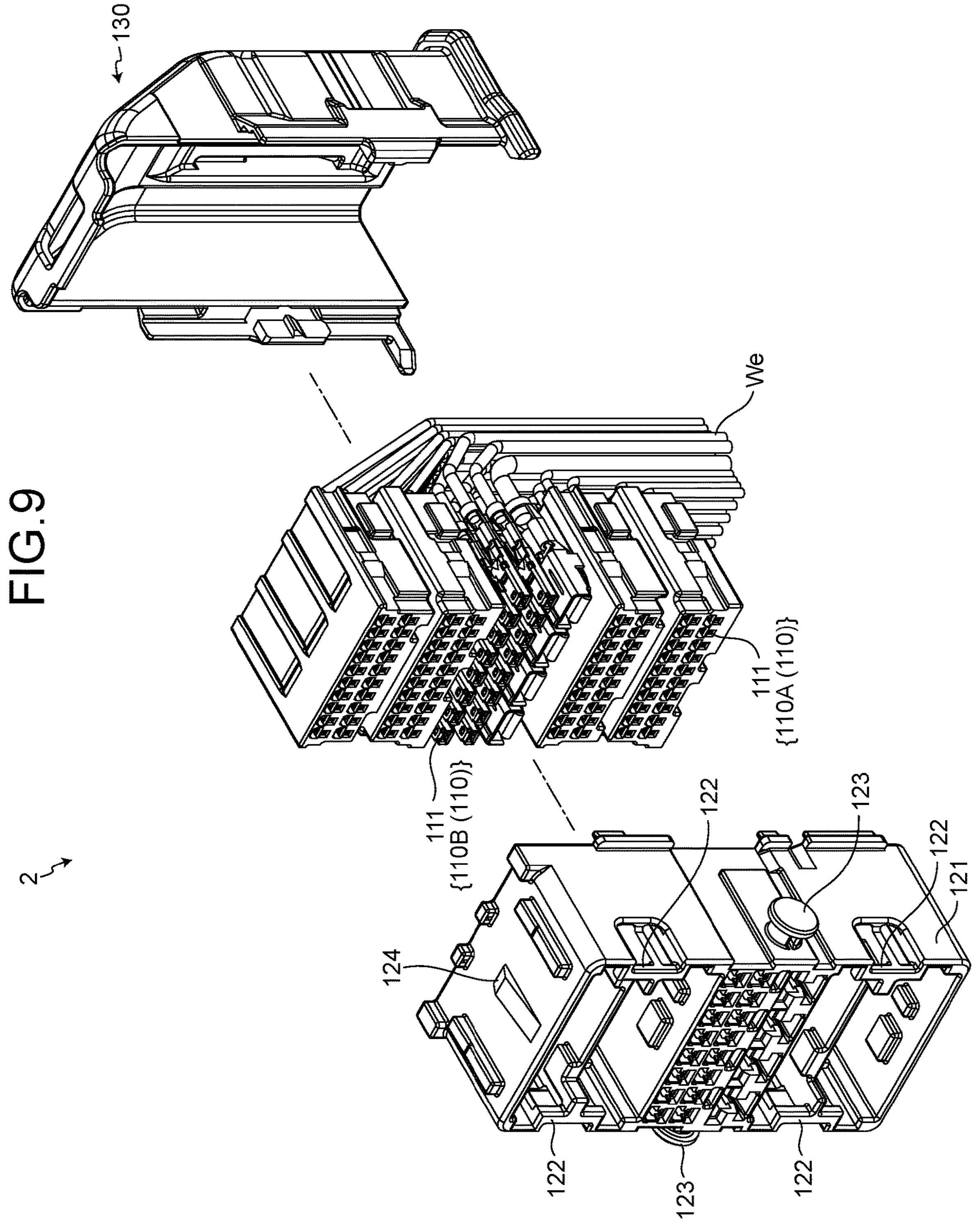
FIG. 9 is an exploded perspective view of the female connector divided for each of main components.
Figure 10:
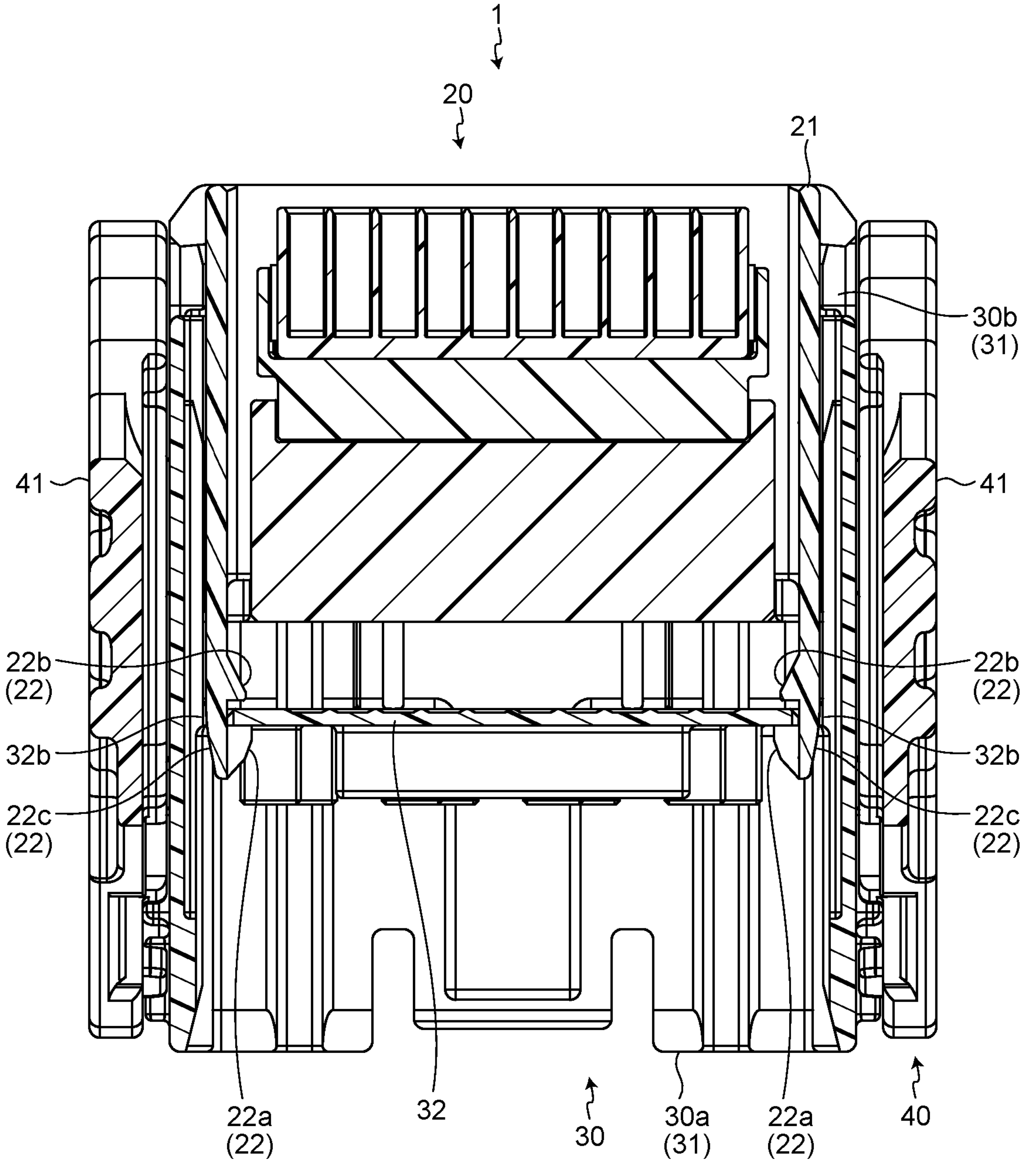
FIG. 10 is a view of the male connector extracted from a cross section taken along line Y1-Y1 in FIG. 2.

The male terminal metal fitting 10 and the female terminal metal fitting 110 are formed of a conductive material such as metal. The male terminal metal fitting 10 and the female terminal metal fitting 110 are fitted and connected to each other in a fitting completed position and physically and electrically connect to each other. The male terminal metal fitting 10 includes a male terminal connecting portion 11 (FIG. 6 and FIG. 8). The female terminal metal fitting 110 includes a female terminal connecting portion 111 (FIG. 7 and FIG. 9). The male terminal metal fitting 10 and the female terminal metal fitting 110 are physically and electrically connected to each other by fitting and connecting the male terminal connecting portion 11 and the female terminal connecting portion 111 in the fitting completed position. The male terminal metal fitting 10 illustrated here is roughly divided into a first male terminal metal fitting 10A in which the male terminal connecting portion 11 is formed in a shaft shape and a second male terminal metal fitting 10B in which the male terminal connecting portion 11 is formed in a piece shape (FIG. 6 and FIG. 8). The female terminal metal fitting 110 illustrated here is roughly divided into a tubular first female terminal metal fitting 110A into which the male terminal connecting portion 11 of the first male terminal metal fitting 10A is fitted and a tubular second female terminal metal fitting 110B into which the male terminal connecting portion 11 of the second male terminal metal fitting 10B is fitted (FIG. 7 and FIG. 9).

The male frame member 20, the hood member 30, the female frame member 120, and the female cover member 130 are formed of an insulating material such as synthetic resin.

The male frame member 20 is a member that houses the male terminal metal fitting 10 while keeping the male terminal connecting portion 11 protruded and includes a male frame main body 21 that houses the male terminal metal fitting 10 (FIG. 1, FIG. 3, and FIG. 5 to FIG. 8). The male frame main body 21 houses the male terminal metal fitting 10 inside while keeping the male terminal connecting portion 11 protruded.

On the other hand, the female frame member 120 includes a female frame main body 121 that houses the female terminal metal fitting 110 (FIG. 1, FIG. 3, FIG. 5 to FIG. 7, and FIG. 9). The female frame main body 121 houses the entire female terminal metal fitting 110 inside. When relatively moving the interconnector from the insertable and removable position to the fitting completed position, the female frame main body 121 inserts the male terminal connecting portion 11 from an opening at one end and fits and connects the male terminal connecting portion 11 to the female terminal connecting portion 111 on the inner side. The female frame main body 121 pulls out an electric wire We (FIG. 1 to FIG. 4), to a terminal of which the female terminal metal fitting 110 is attached, from an opening at the other end. The female cover member 130 is assembled to the female frame member 120 to close the pulled-out electric wire We together with the opening at the other end.

The hood member 30 includes a tubular hood portion 30*a* that relatively moves the female connector 2 in a tube axis direction between the insertable and removable position and the fitting completed position in the tube and a tubular frame housing portion 30*b* that is relatively moved in the tube axis direction between a first hood position in the insertable and removable position and a second hood position in the fitting completed position with respect to the male frame member 20 housed in the tube (FIG. 1, FIG. 3, and FIG. 5 to FIG. 8). That is, when relatively moving the male connector 1 and the female connector 2 between the insertable and removable position and the fitting completed position, the hood member 30 relatively moves the female connector 2 between the insertable and removable position and the fitting completed position and is relatively moved with respect to the male frame member 20 between the first hood position and the second hood position. In the fitting connector, the relative movement between the hood member 30 and the female connector 2 is performed and the relative movement between the male frame member 20 and the hood member 30 is performed according to turning operation (hereinafter referred to as “lever operation”) of a lever member explained below. In the hood member 30, the hood portion 30*a* and the frame housing portion 30*b* are coaxially disposed.

In the hood member 30, the female frame member 120 of the female connector 2 is fitted into the tubular hood portion 30*a* along the tube axis direction (FIG. 1, FIG. 3, and FIG. 5 to FIG. 7). Accordingly, the female frame member 120 is molded in an exterior shape conforming to the tubular shape of the hood portion 30*a*. Further, in the hood member 30, the male frame main body 21 of the male frame member 20 is fitted into the tubular frame housing portion 30*b* along the tube axis direction (FIG. 1, FIG. 3, and FIG. 5 to FIG. 8). Accordingly, the male frame main body 21 is molded in an exterior shape conforming to the tubular shape of the frame housing portion 30*b*.

Figure 5:
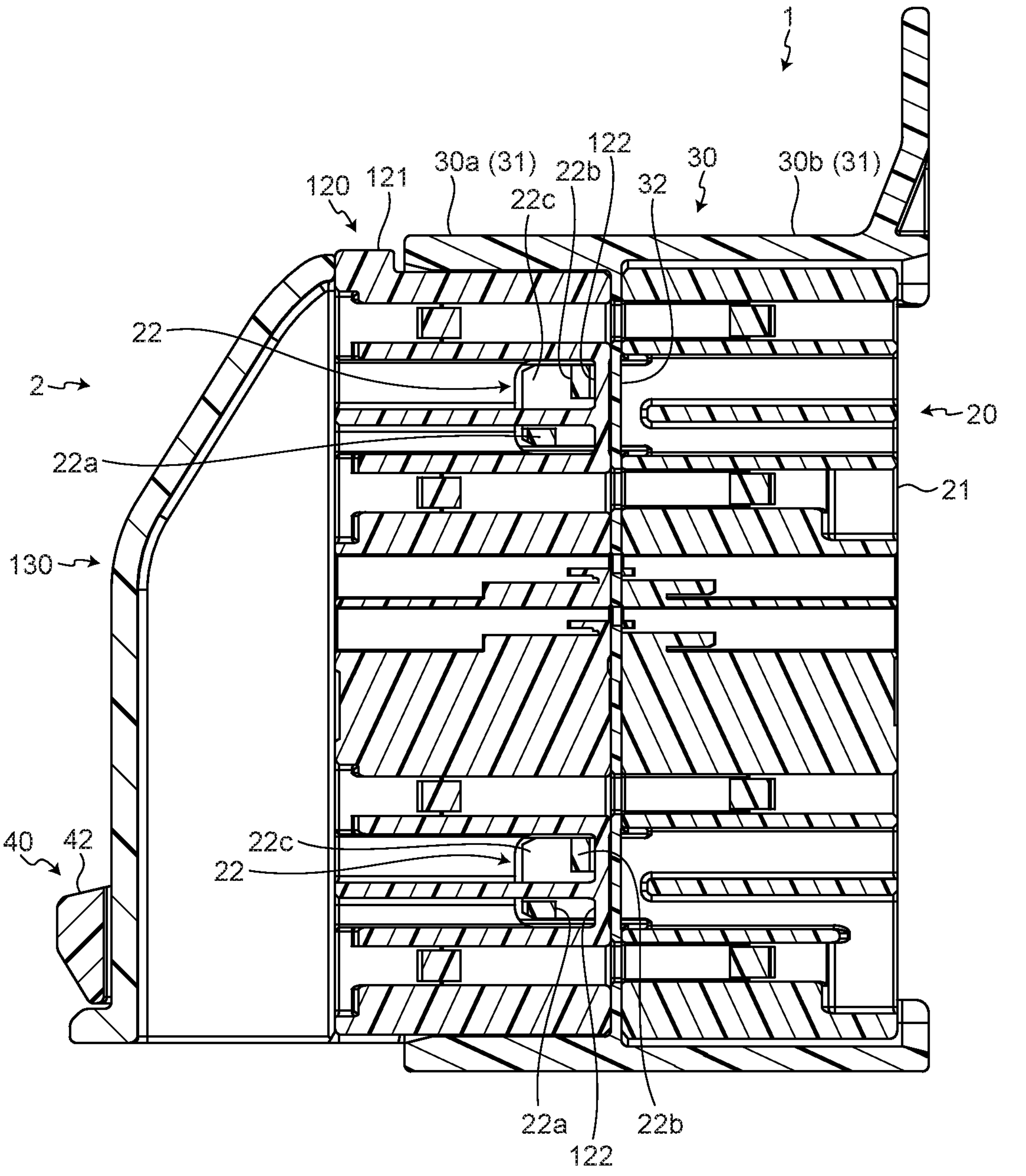
FIG. 5 is a sectional view taken along line X1-X1 in FIG. 4.

The hood member 30 illustrated here includes a tubular body 31 formed in a tubular shape and a flat plate 32 disposed inside the tubular body 31 and partitioning an internal space of the tubular body 31 into one end side and the other end side in the tube axis direction (FIG. 1, FIG. 3, and FIG. 5 to FIG. 8). In the hood member 30, a portion in the tubular body 31 further on one end side than the plate 32 is defined as the hood portion 30*a* and a portion in the tubular body 31 further on the other end side than the plate 32 is defined as the frame housing portion 30*b* (FIG. 5, FIG. 6, and FIG. 8). That is, the plate 32 is disposed in the boundary between the hood portion 30*a* and the frame housing portion 30*b*.

In the plate 32, a through-hole (hereinafter referred to as “terminal insertion hole”) 32*a* through which the male terminal connecting portion 11 of the male terminal metal fitting 10 is inserted is formed for each male terminal metal fitting 10 (FIG. 8). In the plate 32, when the interconnector is in the insertable and removable position and the hood member 30 is in the first hood position (FIG. 1 and FIG. 2), the distal end of the male terminal connecting portion 11 is caused to enter the hood portion 30*a* via the terminal insertion hole 32*a*. When the hood member 30 relatively moves with respect to the male frame member 20 from the first hood position to the second hood position according to the lever operation explained below (FIG. 3 and FIG. 4), the plate 32 increases a protrusion amount of the male terminal connecting portion 11 in the hood portion 30*a* to be larger than an initial protrusion amount in the first hood position. That is, the terminal insertion hole 32*a* of the plate 32 causes the distal end of the male terminal connecting portion 11 to enter the hood portion 30*a* in the first hood position and causes the protrusion amount of the male terminal connecting portion 11 in the hood portion 30*a* to be larger in the second hood position than in the first hood position. In the interconnector, in the hood portion 30*a* in the second hood position, the male terminal connecting portion 11 can be fitted and connected to the female terminal connecting portion 111 in the female frame member 120. When the hood member 30 relatively moves with respect to the male frame member 20 from the second hood position to the first hood position according to the lever operation explained below (FIG. 1 and FIG. 2), the plate 32 resets the projection amount of the male terminal connecting portion 11 in the hood portion 30*a* to the initial projection amount.

In the male frame member 20, flexible plate locking bodies 22 for locking the plate 32 in the first hood position are provided in a plurality of parts (FIG. 5, FIG. 6, FIG. 8, and FIG. 11). The plate locking body 22 locks the plate 32 in the first hood position and stops the hood member 30 in the first hood position.

Figure 11:
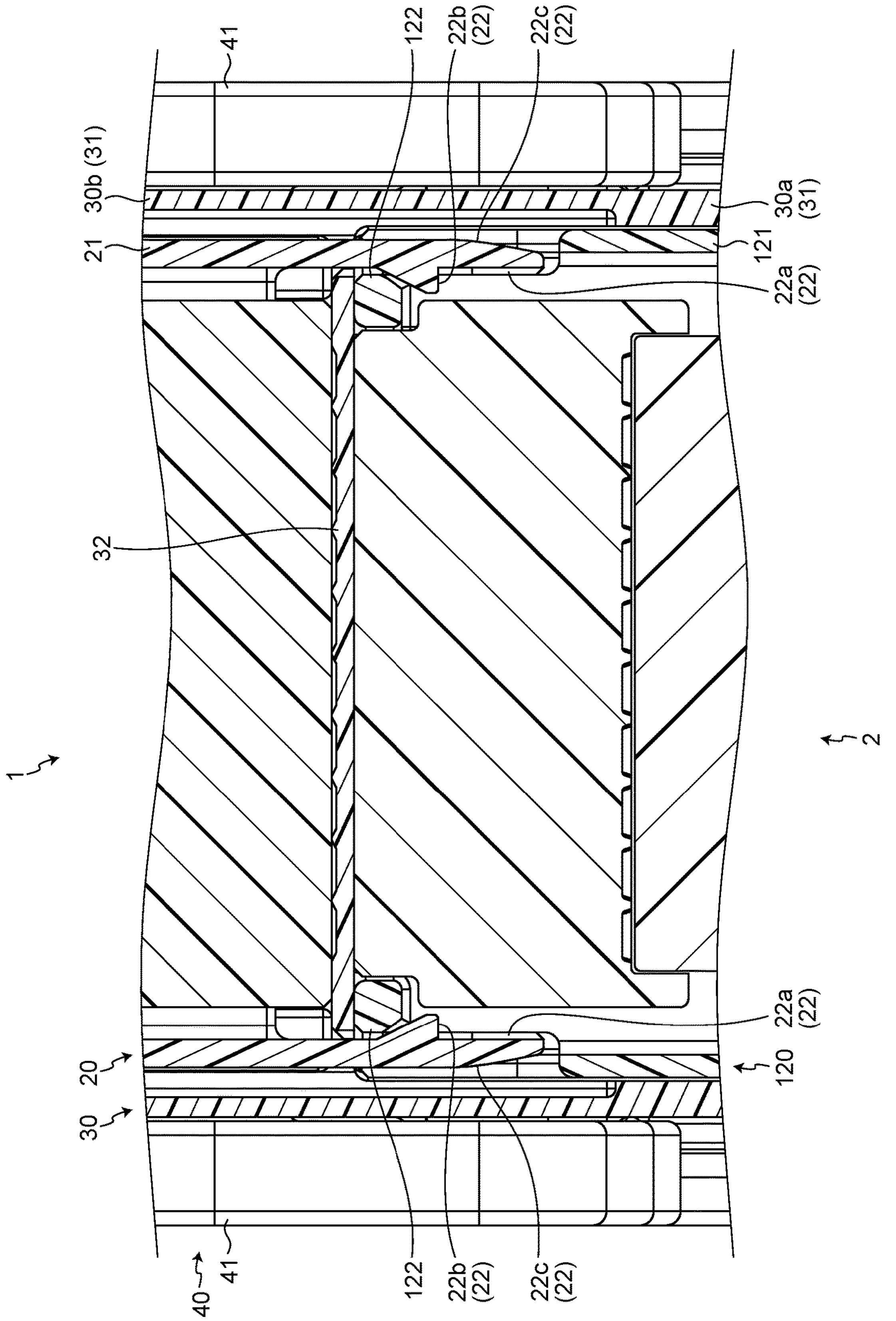
FIG. 11 is a partially enlarged view of the cross section taken along line Y1-Y1 in FIG. 4.
Figure 12:
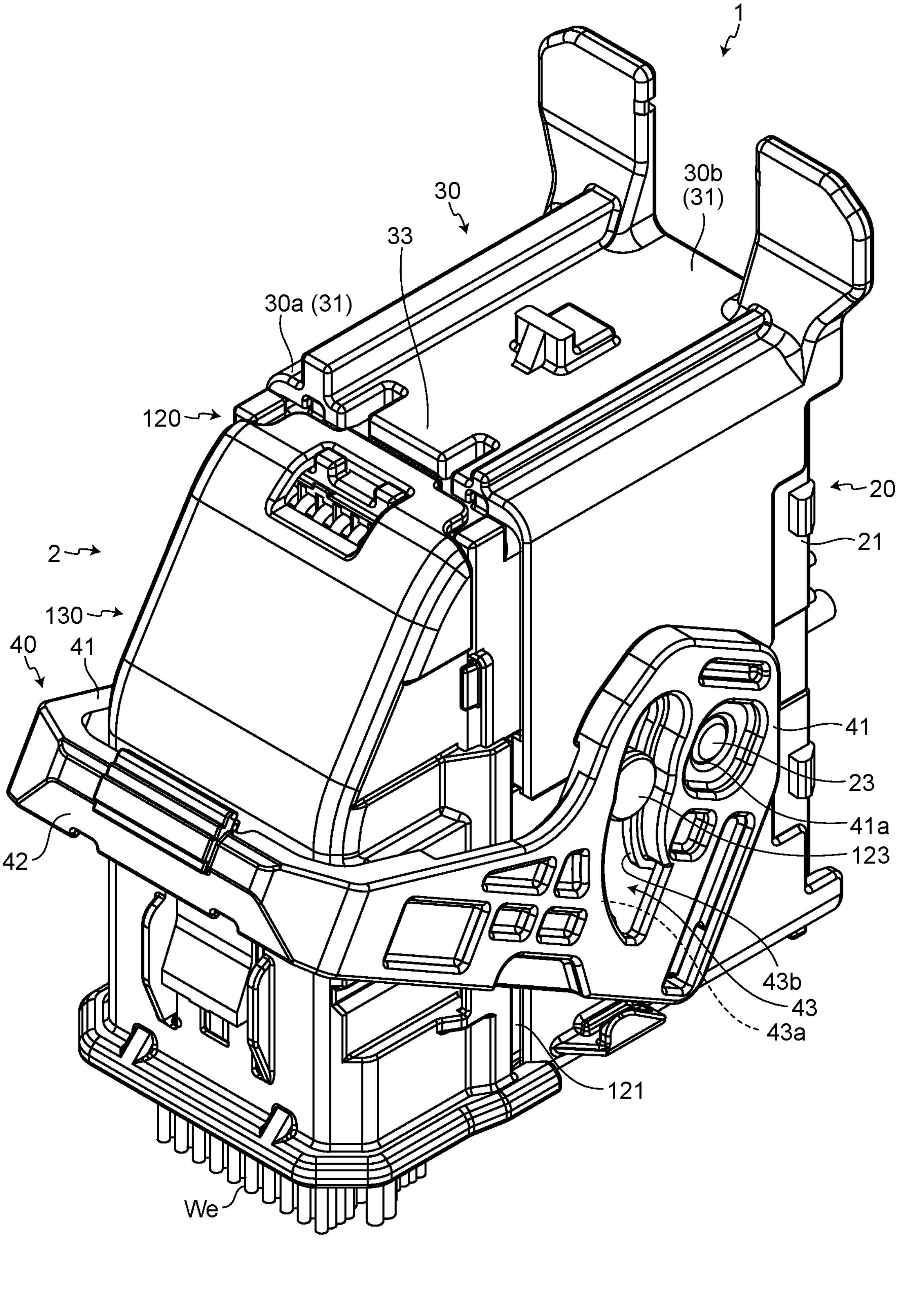
FIG. 12 is a perspective view illustrating the fitting connector in a third lever position in the embodiment.
Figure 13:
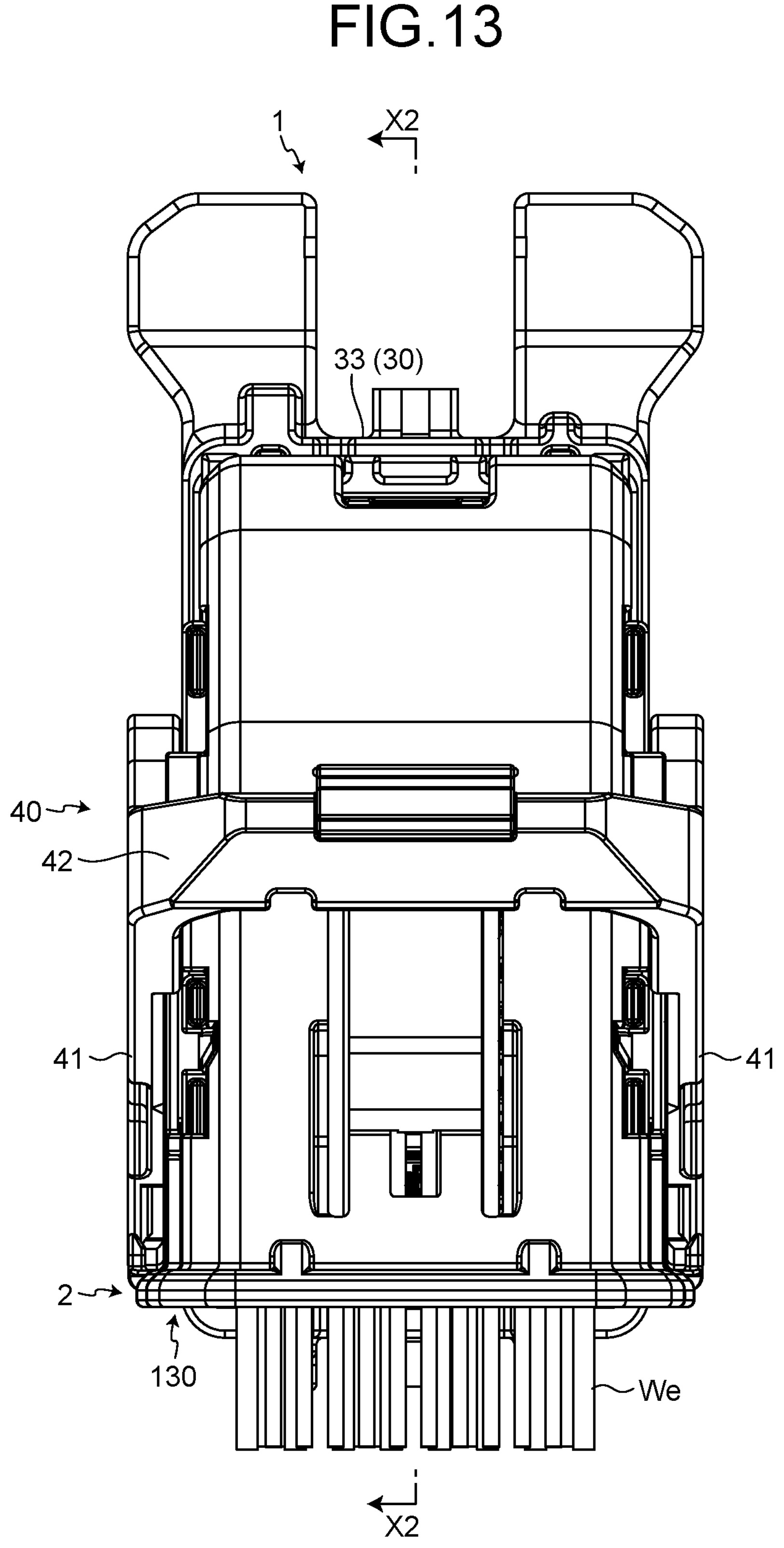
FIG. 13 is a plan view of the fitting connector in the third lever position in the embodiment viewed from the female connector side.

The plate locking body 22 includes a first plate locking protrusion 22*a* and a second plate locking protrusion 22*b* that sandwich an end portion of the plate 32 in the plate thickness direction of the plate 32 when the hood member 30 is in the first hood position (FIG. 5, FIG. 6, FIG. 8, and FIG. 11). When the hood member 30 is in the first hood position, the first plate locking protrusion 22*a* is disposed in the tube of the hood portion 30*a* and the second plate locking protrusion 22*b* is disposed in the tube of the frame housing portion 30*b* (FIG. 5, FIG. 6, and FIG. 8). On the other hand, when the hood member 30 is in the second hood position, the first plate locking protrusion 22*a* and the second plate locking protrusion 22*b* are disposed in the tube of the hood portion 30*a* (FIG. 11).

Further, the plate locking body 22 includes a plate locking piece portion 22*c* that causes the first plate locking protrusion 22*a* and the second plate locking protrusion 22*b* to protrude from a facing wall disposed to face the end portion of the plate 32 and is flexurally deformable in a facing arrangement direction of the plate locking piece portion (FIG. 5, FIG. 6, FIG. 8, and FIG. 11). The plate locking piece portion 22*c* is a cantilever piece portion projecting in the tube axis direction from the male frame main body 21 toward the plate 32 in the frame housing portion 30*b*. The plate locking body 22 is imparted with flexibility by the plate locking piece portion 22*c*.

Here, a through-hole (hereinafter is referred to as "locking hole") 32*b* through which the plate locking body 22 is inserted is formed at the end portion of the plate 32 for each of the plate locking bodies 22 (FIG. 8 and FIG. 11). The plate locking piece portion 22*c* causes the first plate locking protrusion 22*a* and the second plate locking protrusion 22*b* to protrude from a facing wall disposed to face the inner peripheral surface of the locking hole 32*b*. The plate locking piece portion 22*c* illustrated here is formed in a flat piece shape and causes the first plate locking protrusion 22*a* and the second plate locking protrusion 22*b* to protrude from a plane serving as a facing wall.

When the hood member 30 relatively moves with respect to the male frame member 20 from the first hood position (FIG. 1 and FIG. 2) to the second hood position (FIG. 3, FIG. 4, and FIG. 11) according to the lever operation explained below, the plate locking body 22 increases a protrusion amount of the plate locking piece portion 22*c* in the hood portion 30*a* to be larger than an initial protrusion amount in the first hood position (FIG. 11). Therefore, in the plate locking body 22, when the hood member 30 relatively moves with respect to the male frame member 20 from the first hood position to the second hood position, the plate locking piece portion 22*c* is bent in a direction of being pulled apart from the inner peripheral surface of the locking hole 32*b* to release the sandwiching of the end portion of the plate 32 by the first plate locking protrusion 22*a* and the second plate locking protrusion 22*b*. For example, here, a plate unlocking portion 122 for releasing a locked state of the end portion of the plate 32 by the plate locking body 22 is provided in the female frame member 120 (FIG. 5, FIG. 7, FIG. 9, and FIG. 11) and, when the female frame member 120 relatively moves from the insertable and removable position to the fitting completed position in the hood portion 30*a*, the plate unlocking portion 122 pushes the first plate locking protrusion 22*a* to bend the plate locking piece portion 22*c* in a direction of being pulled apart from the inner peripheral surface of the locking hole 32*b*.

Further, when the hood member 30 relatively moves with respect to the male frame member 20 from the second hood position (FIG. 3, FIG. 4, and FIG. 11) to the first hood position (FIG. 1 and FIG. 2) according to the lever operation explained below, the plate locking body 22 resets the protrusion amount of the plate locking piece portion 22*c* in the hood portion 30*a* to the initial protrusion amount. Therefore, in the plate locking body 22, when the hood member 30 relatively moves with respect to the male frame member 20 from the second hood position to the first hood position, the plate locking piece portion 22*c* is bent in a direction of being separated from the inner peripheral surface of the locking hole 32*b* so that the end portion of the plate 32 is not caught by the first plate locking protrusion 22*a* and the second plate locking protrusion 22*b*. For example, here, when the female frame member 120 relatively moves from the fitting completed position to the insertable and removable position in the hood portion 30*a*, the second plate locking protrusion 22*b* is pushed and moved by the plate unlocking portion 122 of the female frame member 120 and the plate locking piece portion 22*c* is bent in a direction of pulling apart from the inner peripheral surface of the locking hole 32*b*.

Here, the exterior shape of the male frame main body 21 of the male frame member 20 is formed in a rectangular parallelepiped shape (FIG. 8). In the hood member 30, the tubular body 31 is formed in a square tubular shape and the plate 32 is formed in a rectangular flat plate shape (FIG. 8). In the hood member 30, the rectangular parallelepiped female frame member 120 is fitted into the rectangular tube-shaped hood portion 30*a* and the rectangular parallelepiped male frame main body 21 is fitted into the rectangular tube-shaped frame housing portion 30*b*.

In the male frame member 20 explained here, four plate locking bodies 22 are disposed close to the outer peripheral surface side of the male frame main body 21 (FIG. 8). Two of the four plate locking bodies 22 are disposed with the facing walls of the plate locking piece portion 22*c* facing each other and the remaining two of the four plate locking bodies 22 are disposed with the facing walls of the plate locking piece portion 22*c* facing each other. Here, the facing walls of paired ones of plate locking piece portions 22*c* are disposed to face each other in the axial direction of a rotating shaft 23 of a lever member 40 explained below.

The male connector 1 includes a lever member 40 that is turnable about an axis of a rotating shaft 23 between the male connector 1 and the male frame member 20 and causes a connector fitting force or a connector removal force involved in the turning to act between the male connector 1 and the female connector 2 (FIG. 1 to FIG. 8). The male frame member 20 includes, on the male frame main body 21, two rotating shafts 23 coaxially protruding in opposite directions each other. The rotating shaft 23 protrudes from two outer wall surfaces parallel to each other in the male frame main body 21.

The lever member 40 is formed of an insulating material such as synthetic resin. The lever member 40 includes an arm portion 41 turnable around the axis of the rotating shaft 23 and an operation portion 42 connected to the arm portion 41 (FIG. 1 to FIG. 8). The operation portion 42 is disposed at an end portion of a moment arm of the arm portion 41, which has the rotating shaft 23 as a rotation center, in a position farthest from the rotating shaft 23 and acts as a force point of the moment arm when the lever operation is performed.

The lever member 40 illustrated here includes two arm portions 41 disposed to face each other with a space therebetween in the axial direction of the rotating shaft 23 (FIG. 1 to FIG. 4 and FIG. 6 to FIG. 8). The arm portion 41 includes, at one end, a through-hole 41*a* functioning as a bearing that pivotally supports the rotating shaft 23 (FIG. 1, FIG. 3, and FIG. 6 to FIG. 8). In the lever member 40, the other ends of the two arm portions 41 are coupled by an operation portion 42 (FIG. 1 to FIG. 4 and FIG. 6 to FIG. 8).

The lever member 40 includes an insertion and removal assisting portion 43 that causes a connector fitting force to act between the male frame member 20 and the female connector 2 by turning the lever member 40 to one side around the axis of the rotating shaft 23 with respect to the male frame member 20 from the first lever position (FIG. 1 and FIG. 2) at the time when the interconnector is the insertable and removable position toward the second lever position (FIG. 3 and FIG. 4) at the time when the interconnector is the fitting completed position and causes a connector removal force to act between the male frame member 20 and the female connector 2 by turning the lever member 40 to the other side around the axis of the rotating shaft 23 with respect to the male frame member 20 from the second lever position (FIG. 3 and FIG. 4) toward the first lever position (FIG. 1 and FIG. 2) (FIG. 1, FIG. 3, and FIG. 6 to FIG. 8).

Figure 2:
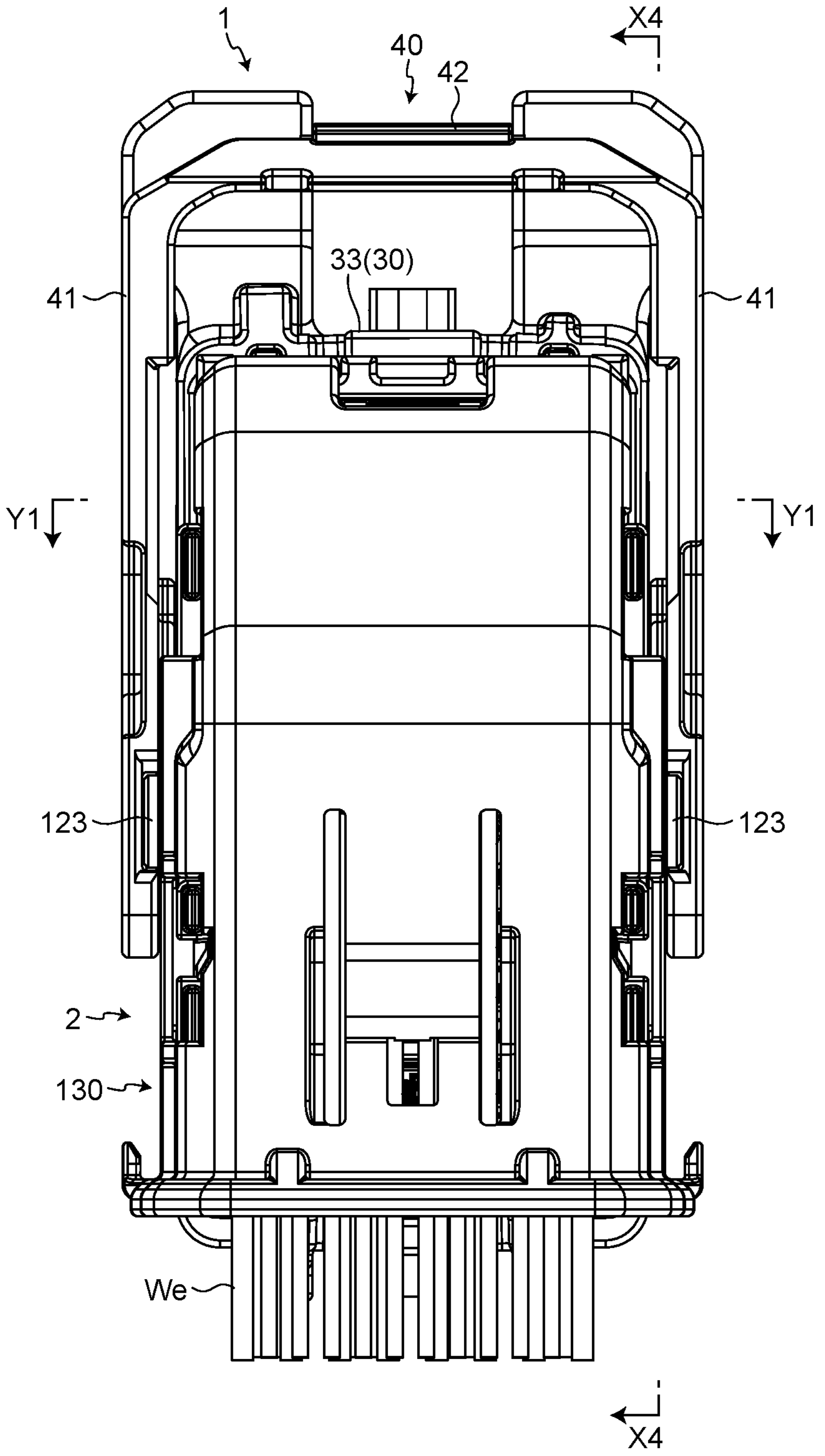
FIG. 2 is a plan view of the fitting connector in the insertable and removable position (the first lever position) in the embodiment viewed from a female connector side.
Figure 3:
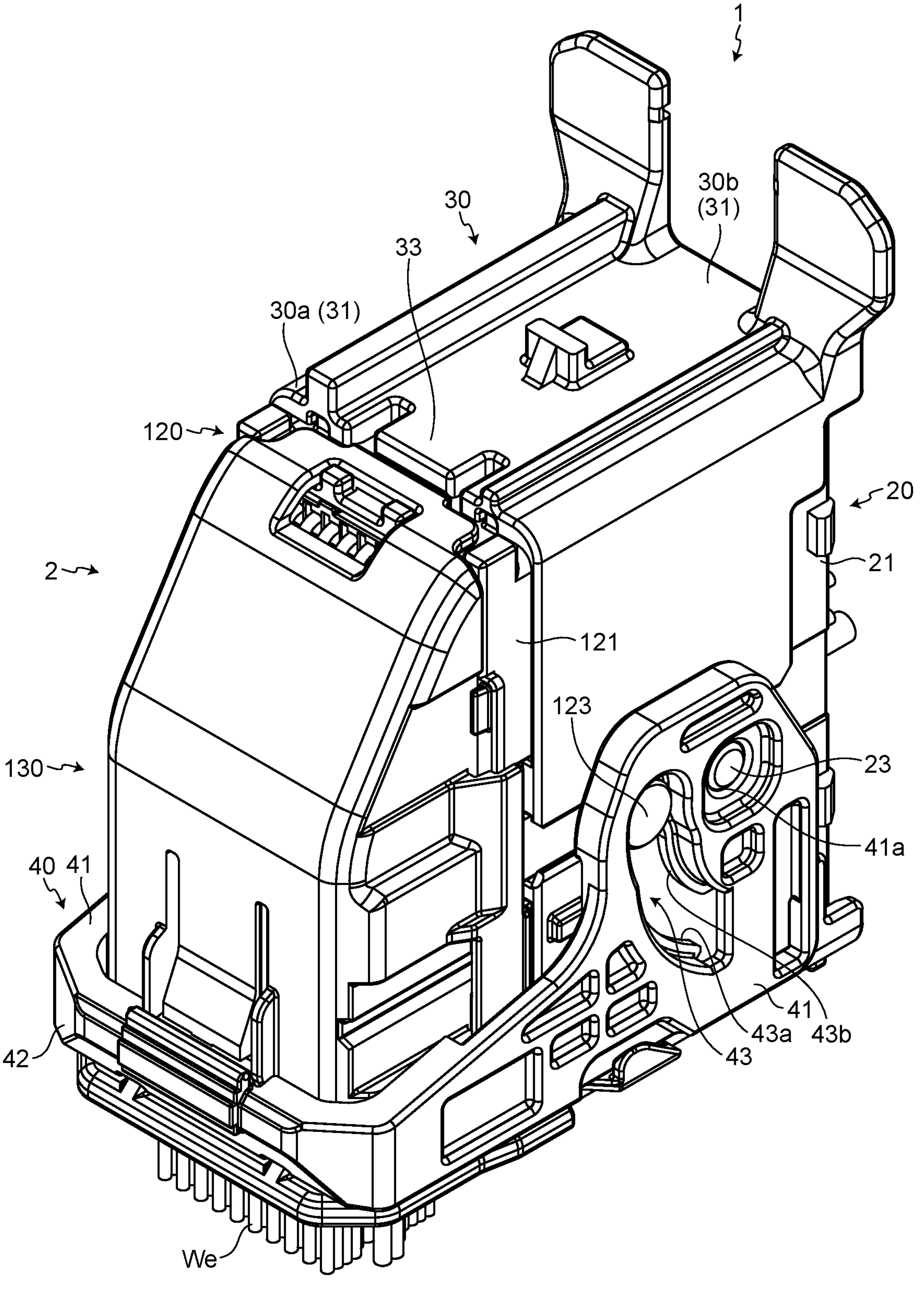
FIG. 3 is a perspective view illustrating the fitting connector in a fitting completed position (a second lever position) in the embodiment.
Figure 4:
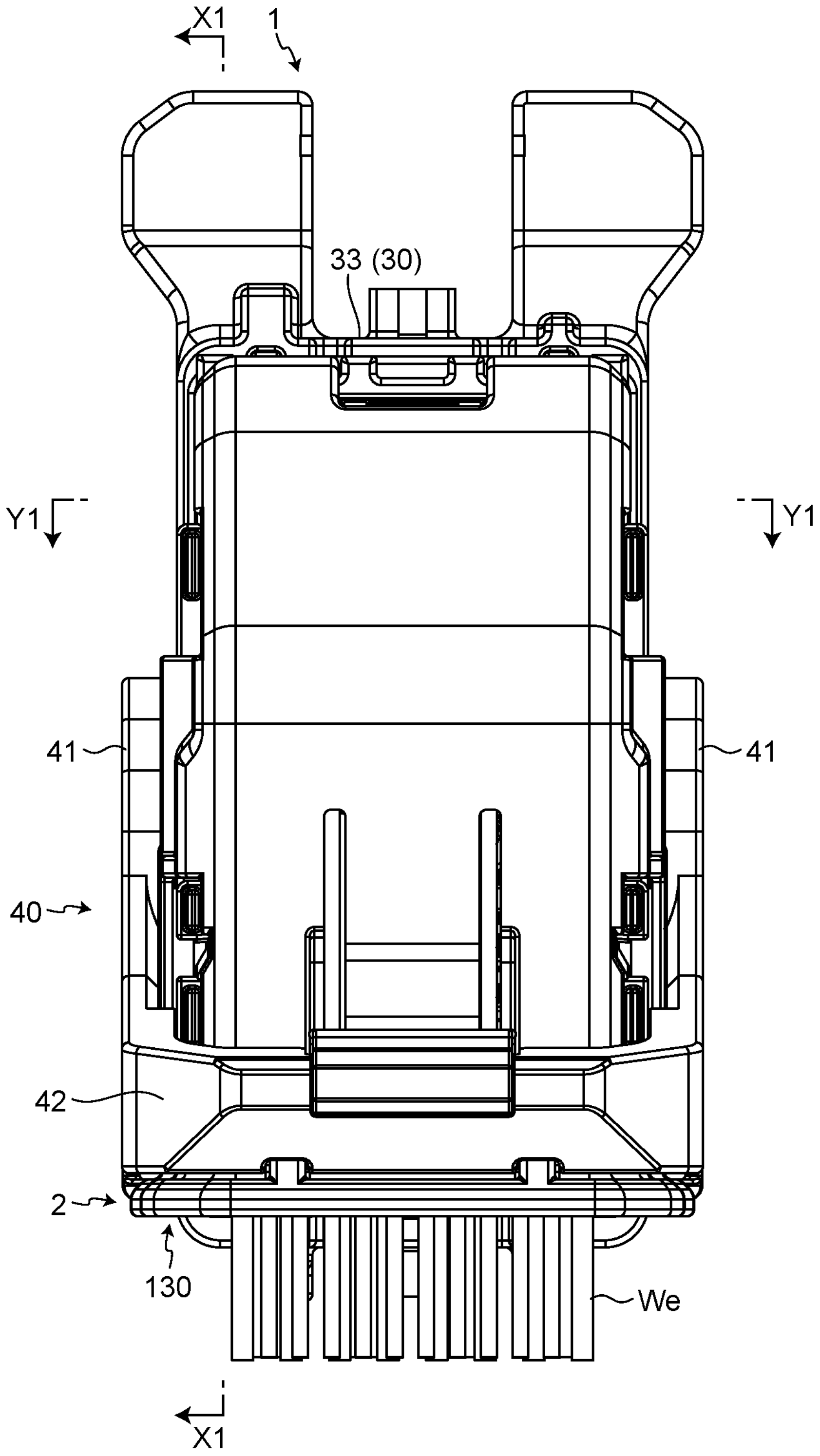
FIG. 4 is a plan view of the fitting connector in the fitting completed position (the second lever position) in the embodiment viewed from the female connector side.

In the male connector 1, when the lever member 40 is in the first lever position, the hood member 30 is disposed in the first hood position with respect to the male frame member 20 (FIG. 1 and FIG. 2). In the male connector 1, when the lever member 40 is in the second lever position, the hood member 30 is disposed in the second hood position with respect to the male frame member 20 (FIG. 3 and FIG. 4).

The insertion and removal assisting portion 43 is a through-hole provided between one end and the other end of the moment arm in the arm portion 41 and is provided for each arm portion 41. These two insertion and removal assisting portions 43 are arc-shaped through-holes having the same projected shape projected in the axial direction of the rotating shaft 23 and are convex toward the other end side of the arm portion 41. The through-hole 41*a* (the rotating shaft 23) is disposed closer to one end side of the arm portion 41 than the insertion and removal assisting portion 43.

A guide shaft 123 of the female connector 2 that receives the connector fitting force or the connector removal force from the lever member 40 is inserted into the insertion and removal assisting portion 43 (FIG. 1 to FIG. 3, FIG. 6, and FIG. 7). The insertion and removal assisting portion 43 guides the guide shaft 123 between one end and the other end in the circumferential direction in association with lever operation. The guide shaft 123 slides while being guided by the insertion and removal assisting portion 43 and receive the connector fitting force or the connector removal force from the insertion and removal assisting portion 43. The guide shaft 123 is provided in the female frame member 120. Each guide shaft 123 explained here is projected from two outer wall surfaces parallel to each other in the female frame member 120. These two guide shafts 123 are projected coaxially in directions opposite to each other.

In the interconnector, by rotating the lever member 40 from the first lever position toward the second lever position in the insertable and removable position, the guide shaft 123 is guided from one end to the other end of the insertion and removal assisting portion 43 along the first inner wall surface 43*a* while pushing and moving the guide shaft 123 by the arc-shaped outer first inner wall surface 43*a* of the insertion and removal assisting portion 43 with the rotation (FIG. 1, FIG. 3, FIG. 6, and FIG. 7). In the interconnector, a connector fitting force is generated by a pressing force caused to act on the guide shaft 123 from the first inner wall surface 43*a* of the insertion and removal assisting portion 43 and the interconnector relatively moves from the insertable and removable position to the fitting completed position.

In the interconnector, by rotating the lever member 40 from the second lever position toward the first lever position in the fitting completed position, the guide shaft 123 is guided from the other end to one end of the insertion and removal assisting portion 43 along the second inner wall surface 43*b* while pushing and moving the guide shaft 123 with the arc-shaped inner second inner wall surface 43*b* of the insertion and removal assisting portion 43 according to the rotation (FIG. 1, FIG. 3, FIG. 6, and FIG. 7). In the interconnector, a connector removal force is generated by the pressing force caused to act on the guide shaft 123 from the second inner wall surface 43*b* of the insertion and removal assisting portion 43 and the interconnector relatively moves from the fitting completed position to the insertable and removable position.

The plate locking body 22 is flexurally deformed using turning operation of the lever member 40.

As explained above, the lever member 40 is turned in one direction around the axis of the rotating shaft 23 with respect to the male frame member 20 from the first lever position (FIG. 1 and FIG. 2) toward the second lever position (FIG. 3 and FIG. 4) to cause the connector fitting force to act between the male frame member 20 and the female connector 2. Therefore, the lever member 40 can bring the female connector 2 close to the male frame member 20 with the connector fitting force. Here, the plate locking body 22 is flexurally deformed by input from the female connector 2 brought close to the male frame member 20 by the connector fitting force to release the locked state of the plate 32 by the plate locking body 22. That is, the lever member 40 is turned in one direction around the axis of the rotating shaft 23 with respect to the male frame member 20 from the first lever position to the second lever position to generate a connector fitting force between the male frame member 20 and the female connector 2. The plate locking body 22 is flexurally deformed by the input from the female connector 2 brought close to the male frame member 20 by the connector fitting force to release the locked state of the plate 32 by the plate locking body 22.

When the lever member 40 is turned from the first lever position toward the second lever position, the female connector 2 applies a force from the plate unlocking portion 122 to the plate locking body 22 to flexurally deform the plate locking body 22. That is, when the lever member 40 is turned from the first lever position toward the second lever position, the lever member 40 brings the female connector 2 close to the male frame member 20 with the connector fitting force, inputs the connector fitting force from the plate unlocking portion 122 of the female connector 2 to the plate locking body 22, and flexurally deforms the plate locking body 22. When the lever member 40 is turned from the first lever position toward the second lever position, the plate unlocking portion 122 flexibly deforms the plate locking body 22 while pushing an inclined surface of the first plate locking protrusion 22*a* with the connector fitting force received via the guide shaft 123.

When the lever member 40 is turned from the first lever position toward the second lever position, the lever member 40 flexurally deforms the plate locking body 22 as explained above and pushes and relatively moves the hood member 30 in the first hood position toward the second hood position with the input from the female connector 2. When the lever member 40 is turned from the first lever position toward the second lever position, the plate unlocking portion 122 of the female connector 2 climbs over the first plate locking protrusion 22*a* according to the flexural deformation of the plate locking body 22 and climbs over the second plate locking protrusion 22*b* together with the plate 32 while pushing the plate 32 to relatively move the hood member 30 from the first hood position to the second hood position.

As explained above, the lever member 40 is turned in the other direction around the axis of the rotating shaft 23 with respect to the male frame member 20 from the second lever position (FIG. 3 and FIG. 4) toward the first lever position (FIG. 1 and FIG. 2) to cause a connector removal force to act between the male frame member 20 and the female connector 2. Therefore, the lever member 40 can pull the female connector 2 apart from the male frame member 20 with the connector removal force. Here, the plate locking body 22 is flexurally deformed by the input from the female connector 2 pulled apart from the male frame member 20 by the connector removal force and the hood member 30 in the second hood position is relatively moved toward the first hood position by the input from the female connector 2. That is, the lever member 40 is turned to the other side around the axis of the rotating shaft 23 with respect to the male frame member 20 from the second lever position toward the first lever position to thereby generate a connector removal force between the male frame member 20 and the female connector 2. The plate locking body 22 is flexurally deformed by input from the female connector 2 pulled apart from the male frame member 20 by the connector removal force and the hood member 30 in the second hood position is relatively moved toward the first hood position by the input from the female connector 2.

When the lever member 40 is turned from the second lever position toward the first lever position, the female connector 2 applies force from the plate unlocking portion 122 to the plate locking body 22 to flexurally deform the plate locking body 22. That is, when the lever member 40 is turned from the second lever position toward the first lever position, the female connector 2 is pulled apart from the male frame member 20 by the connector removal force and the connector removal force is input from the plate unlocking portion 122 of the female connector 2 to the plate locking body 22 to flexurally deform the plate locking body 22. When the lever member 40 is turned to the third lever position (FIG. 12 and FIG. 13) from the second lever position (FIG. 3 and FIG. 4) toward the first lever position (FIG. 1 and FIG. 2) and the lever member 40 is further turned to the fourth lever position (FIG. 14 and FIG. 15) from the third lever position toward the first lever position, the plate unlocking portion 122 flexurally deforms the plate locking body 22 while pushing an inclined surface of the second plate locking protrusion 22*b* with the connector removal force received via the guide shaft 123. The plate unlocking portion 122 climbs over the first plate locking protrusion 22*a* and the second plate locking protrusion 22*b* when the lever member 40 is in the fourth lever position according to the flexural deformation of the plate locking body 22.

Here, in order to turn the lever member 40 from the second lever position toward the first lever position and relatively move the hood member 30 from the first hood position to the second hood position, the female frame member 120 includes a hood locking protrusion body (hereinafter referred to as "first hood locking protrusion body") 124 that is protruded from the outer wall surface and locks a hood locking body (hereinafter referred to as "first hood locking body") 33 having flexibility in the hood member 30 (FIG. 1 to FIG. 4, FIG. 6 to FIG. 9, and FIG. 12 to FIG. 17).

Figure 17:
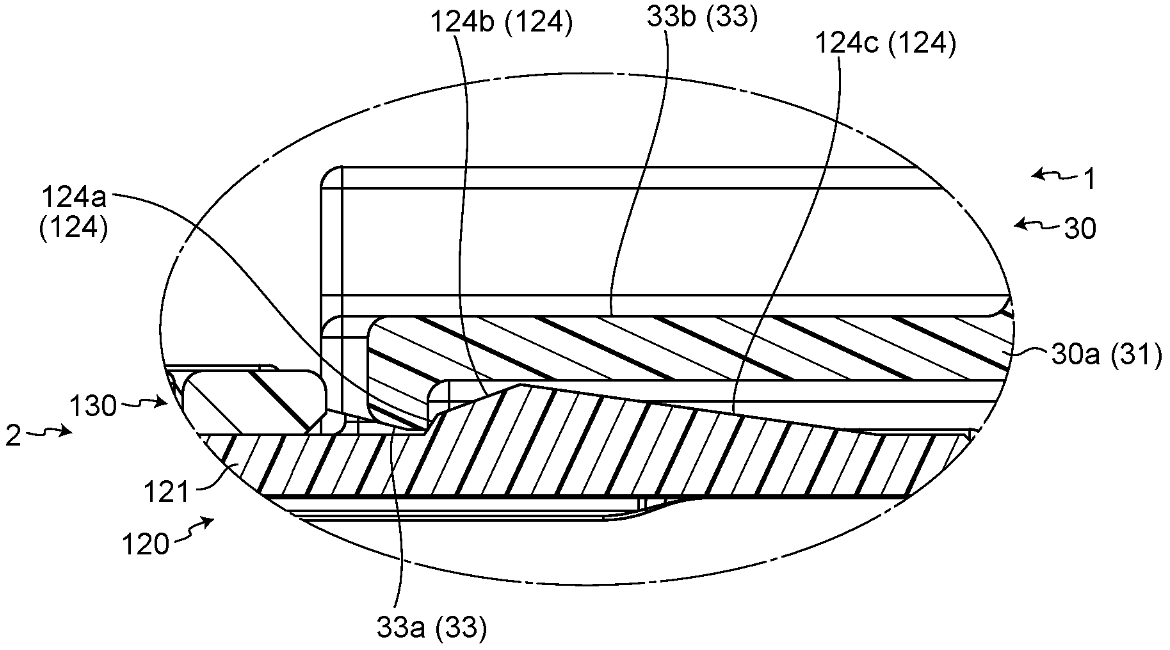
FIG. 17 is a partially enlarged view of a cross section taken along line X2-X2 in FIG. 13.

The first hood locking body 33 includes a hood locking protrusion 33*a* that is locked to the first hood locking protrusion body 124 when the hood member 30 is in the second hood position and suppresses movement in a separation direction between the hood member 30 and the female frame member 120 from the fitting completed position toward the insertable and removable position (FIG. 17). The first hood locking body 33 includes a hood locking piece portion 33*b* that is flexurally deformable in a direction of releasing a locked state between the hood locking protrusion 33*a* and the first hood locking protrusion body 124 (FIG. 17). The hood locking piece portion 33*b* is a cantilever piece portion formed by cutting out a part of the hood portion 30*a* of the hood member 30 and has a free end on an opening side in the tube axis direction of the hood portion 30*a*. In the hood locking piece portion 33*b*, the hood locking protrusion 33*a* is protruded from an inner wall surface on a free end side of the hood locking piece portion 33*b*.

Figure 16:
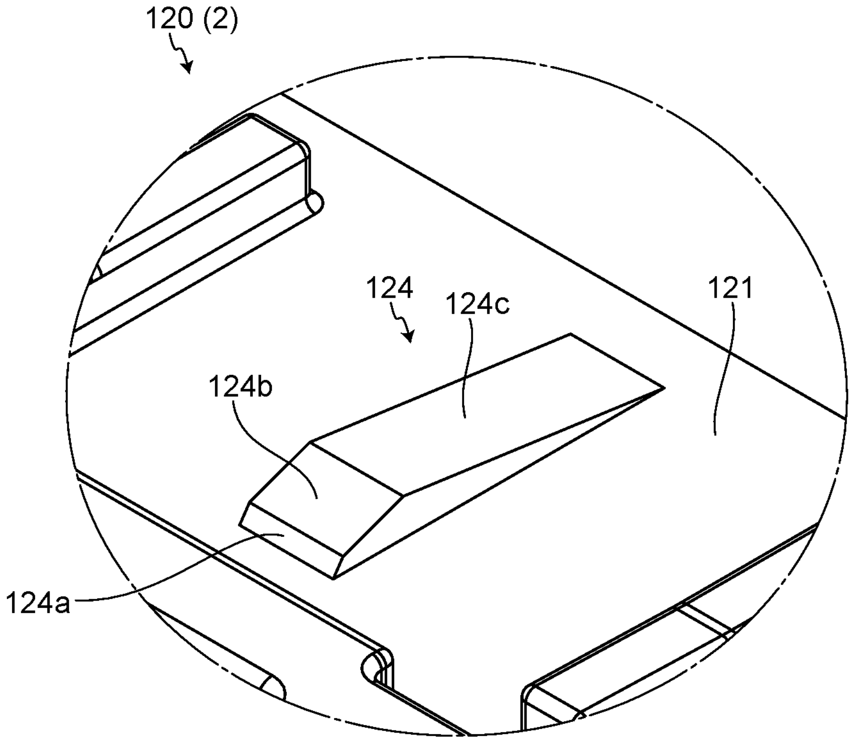
FIG. 16 is an enlarged view of a part A in FIG. 6.

The first hood locking protrusion body 124 has a locking surface 124*a* that locks the hood locking protrusion 33*a* of the first hood locking body 33 in the second hood position and locks movement in the separation direction between the hood member 30 and the female frame member 120 from the fitting completed position toward the insertable and removable position (FIG. 16 and FIG. 17). In the second hood position, a very small gap is sometimes present between the hood locking protrusion 33*a* and the locking surface 124*a* because of, for example, tolerance variation of components. When the lever member 40 is turned from the second lever position to the third lever position, if such a gap is present, the gap is clogged and the first hood locking protrusion body 124 keeps the locking surface 124*a* locking the hood locking protrusion 33*a* until the plate 32 climbs over the second plate locking protrusion 22*b* of the flexurally deformed plate locking body 22 (FIG. 17). Then, the first hood locking protrusion body 124 keeps, until the plate 32 climbs over the second plate locking protrusion 22*b*, the locking surface 124*a* locking the hood locking protrusion 33*a* to thereby pull apart the hood member 30 from the male frame member 20 together with the female frame member 120 and relatively move the hood member 30 from the second hood position toward the first hood position.

Figure 14:
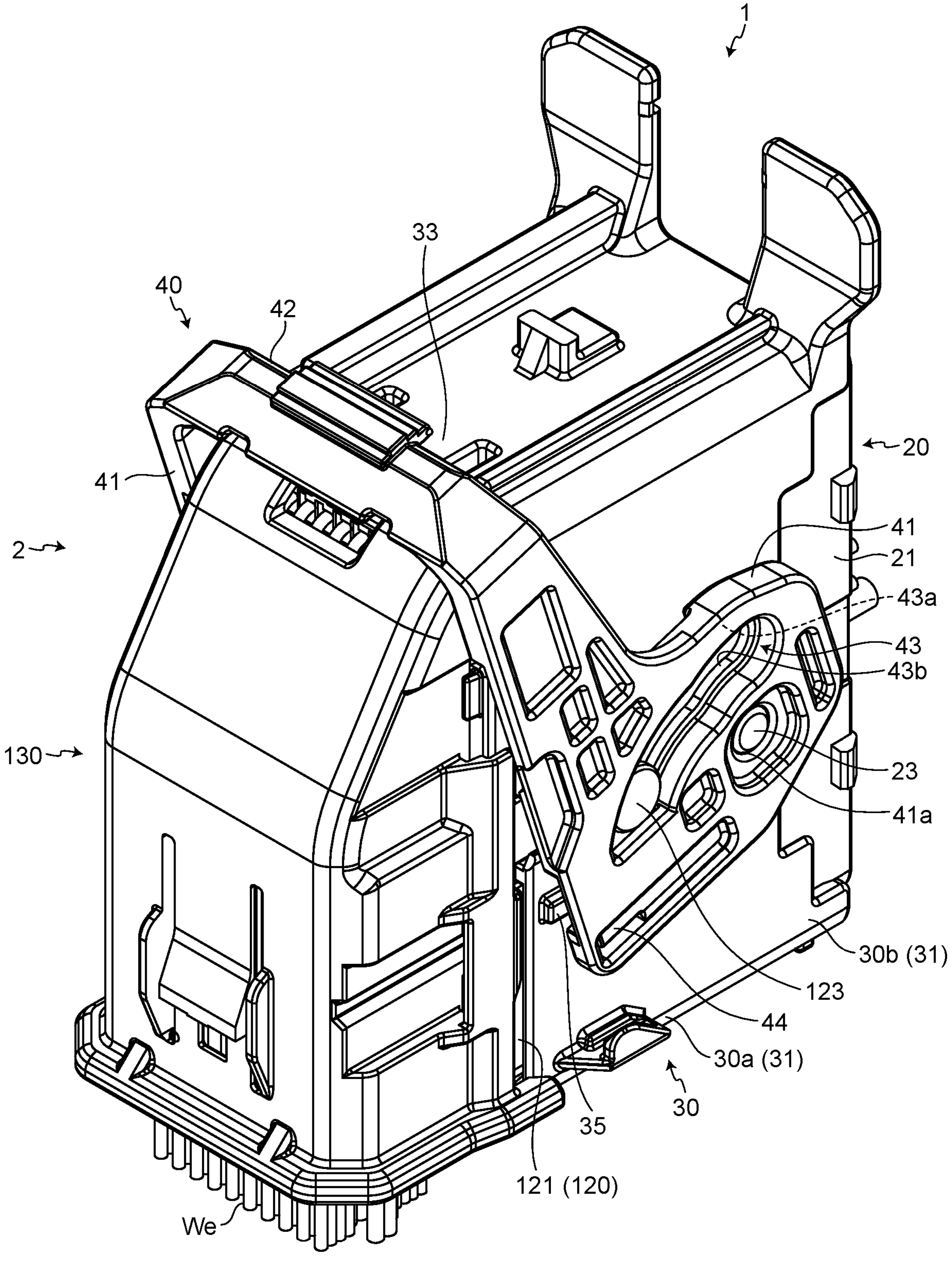
FIG. 14 is a perspective view illustrating the fitting connector in a fourth lever position in the embodiment.
Figure 15:
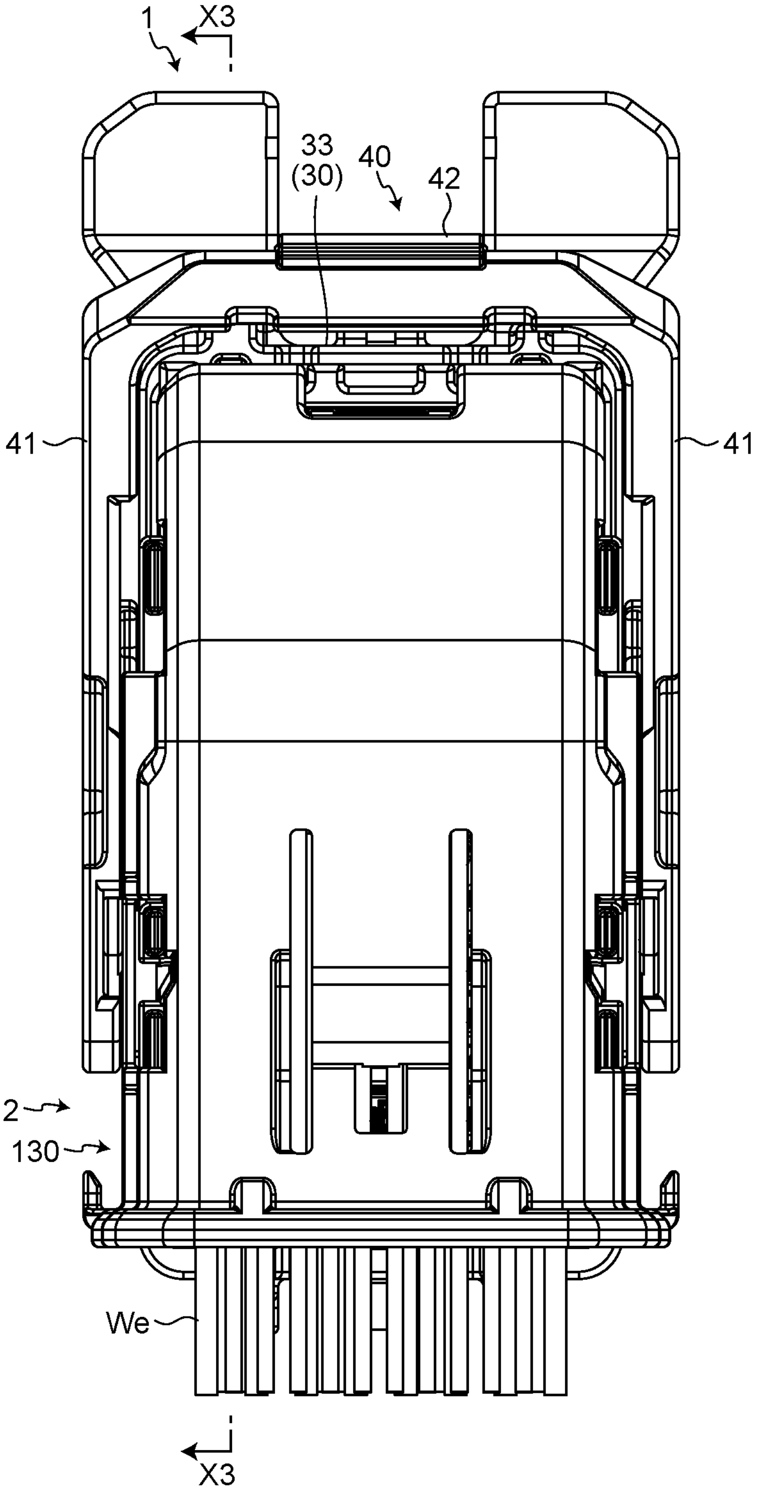
FIG. 15 is a plan view of the fitting connector in the fourth lever position in the embodiment viewed from the female connector side.

Here, the hood locking protrusion 33*a* is continuously locked by the locking surface 124*a* until the lever member 40 is turned from the second lever position (FIG. 3 and FIG. 4) to the fourth lever position (FIG. 14 and FIG. 15). Accordingly, when the lever member 40 is turned from the second lever position to the fourth lever position, the first hood locking protrusion body 124 keeps, until the plate 32 climbs over the second plate locking protrusion 22*b* of the flexurally deformed plate locking body 22, locking the hood locking protrusion 33*a* with the locking surface 124*a* to thereby relatively move the hood member 30 from the second hood position toward the first hood position.

Figure 18:
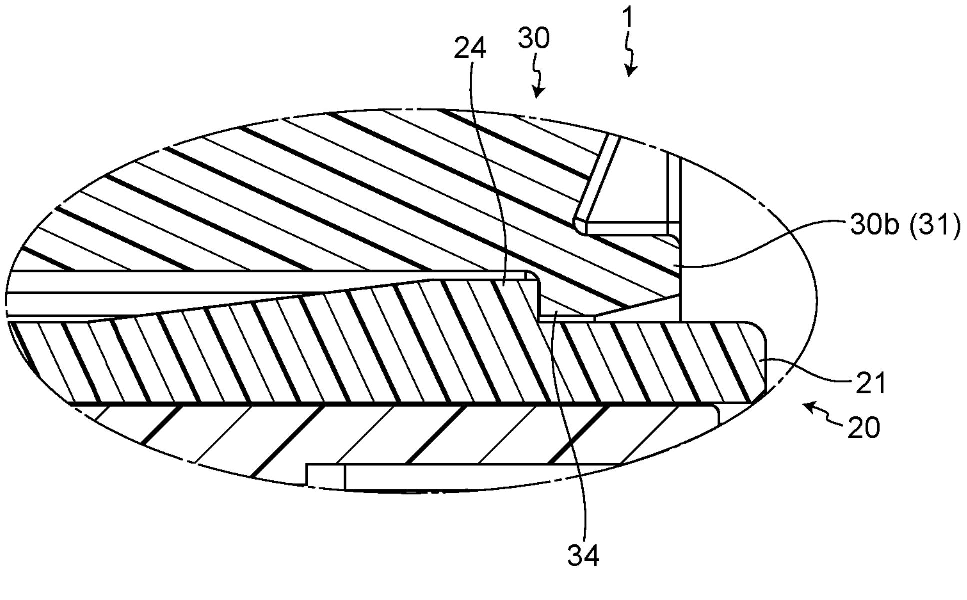
FIG. 18 is a partially enlarged view of a cross section taken along line X3-X3 in FIG. 15.
Figure 19:
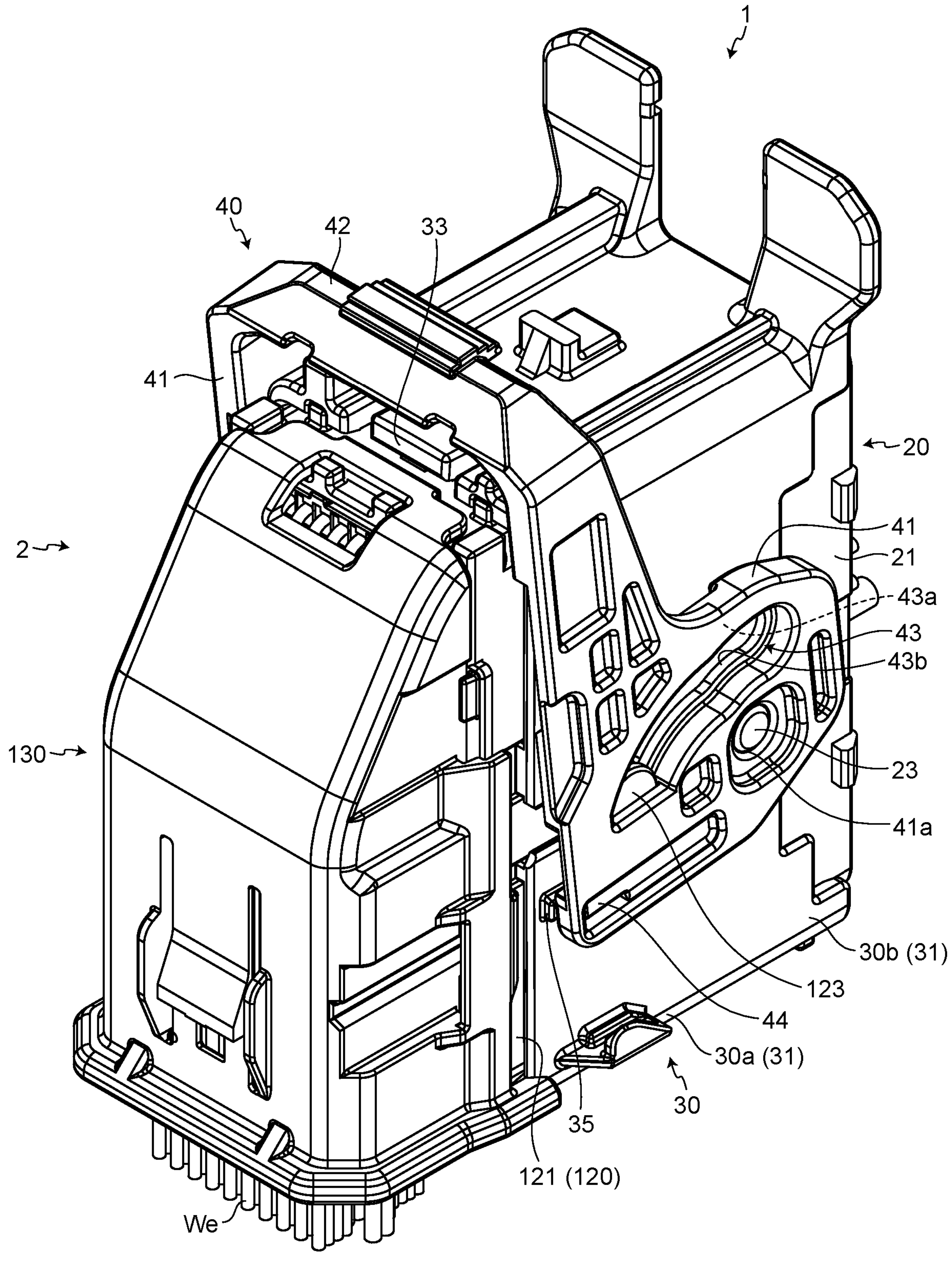
FIG. 19 is a perspective view illustrating the fitting connector in a fifth lever position in the embodiment.
Figure 20:
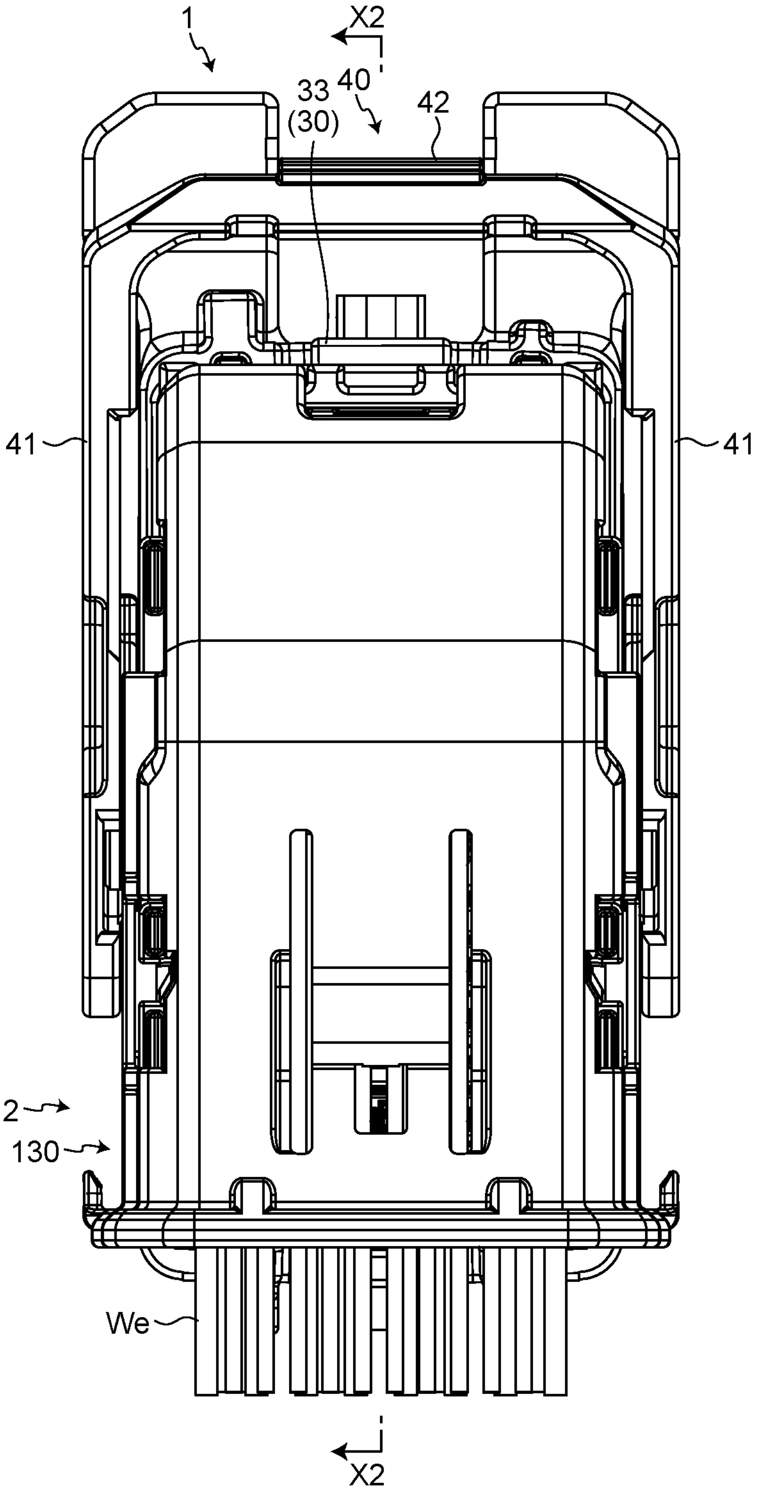
FIG. 20 is a plan view of the fitting connector in the fifth lever position in the embodiment viewed from the female connector side.

In this fitting connector, the male connector 1 and the female connector 2 can be separated by turning the lever member 40 from the fourth lever position (FIG. 14 and FIG. 15) to the first lever position (FIG. 1 and FIG. 2). Therefore, the hood member 30 is provided with a second hood locking body 34 besides the first hood locking body 33 (FIG. 18). The second hood locking body 34 is projected from an inner wall surface on the opening side in the frame housing portion 30*b* of the hood member 30. The male frame member 20 is provided with a second hood locking protrusion body 24 that, when the lever member 40 is turned from the second lever position to reach the fourth lever position, locks the second hood locking body 34 of the hood member 30 and, when the lever member 40 is turned from the fourth lever position to the first lever position, keeps the second hood locking body 34 locked and stops hood member 30 in the first hood position (FIG. 8 and FIG. 18).

The second hood locking protrusion body 24 locks the second hood locking body 34 after the plate unlocking portion 122 and the plate 32 climb over the second plate locking protrusion 22*b*. Specifically, the second hood locking protrusion body 24 locks the second hood locking body 34 after the plate unlocking portion 122 and the plate 32 climb over the second plate locking protrusion 22*b* and the end portion of the plate 32 can be located between the first plate locking protrusion 22*a* and the second plate locking protrusion 22*b*. Here, two sets of combinations of the second hood locking body 34 and the second hood locking protrusion body 24 are provided.

In this fitting connector, an inclined locking surface 124*b* continuing to the locking surface 124*a* is provided in the first hood locking protrusion body 124 in order to keep the hood member 30 locked in the first hood position while locking the second hood locking body 34 with the second hood locking protrusion body 24 when the lever member 40 is turned from the fourth lever position (FIG. 14 and FIG. 15) toward the first lever position (FIG. 1 and FIG. 2) (FIG. 16 and FIG. 17). In the first hood locking protrusion body 124, the locking surface 124*a* is formed as an inclined surface that flexurally deforms the first hood locking body 33 with force acting on the hood locking protrusion 33*a* and causes the hood locking protrusion 33*a* to climb on the inclined locking surface 124*b* when the lever member 40 is turned from the fourth lever position toward the first lever position. The inclined locking surface 124*b* is formed as an inclined surface that locks the hood locking protrusion 33*a* until a pulling-apart force for separating the male connector 1 and the female connector 2 from each other is applied between the male connector 1 and the female connector 2 in the insertable and removable position and, when the pulling-apart force is applied between the male connector 1 and the female connector 2, further flexurally deforms the first hood locking body 33 with force caused to act on the hood locking protrusion 33*a* and causes the hood locking protrusion 33*a* to climb over the first hood locking protrusion body 124.

For example, the inclined locking surface 124*b* locks the hood locking protrusion 33*a* in the fifth lever position (FIG. 19 and FIG. 20) halfway in movement of the lever member 40 from the fourth lever position to the first lever position (FIG. 21) and continues the locked state until the lever member 40 reaches the first lever position from the fifth lever position.

Figure 21:
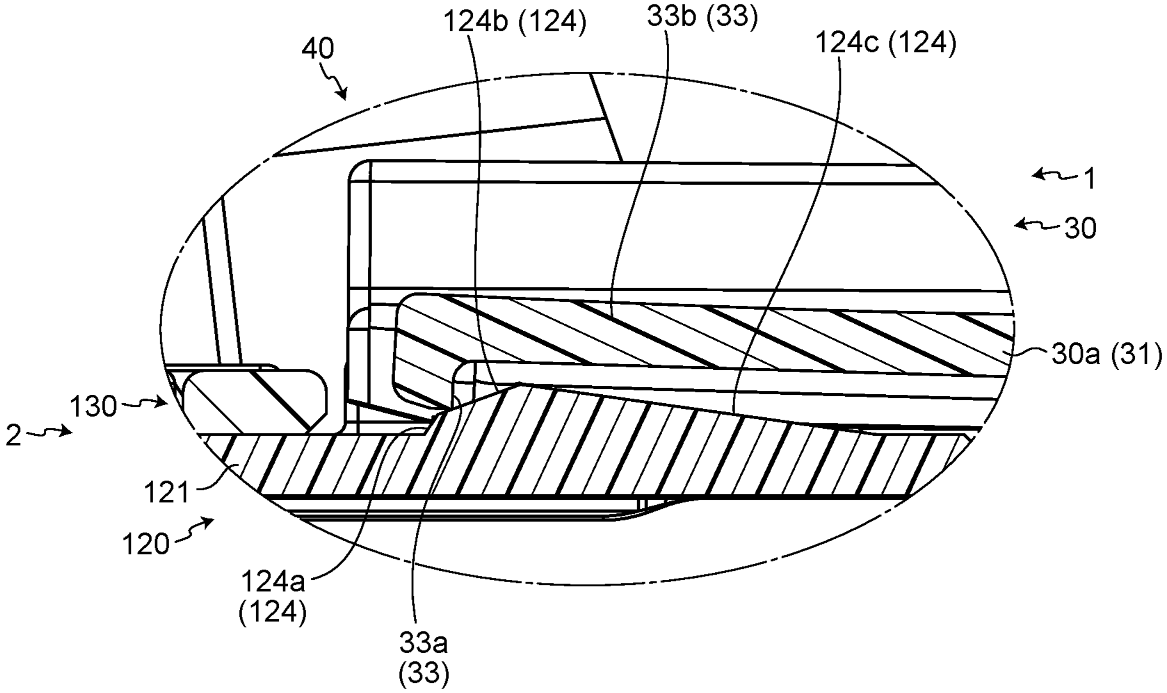
FIG. 21 is a partially enlarged view of a cross section taken along line X2-X2 in FIG. 20.

The first hood locking protrusion body 124 is provided with an inclined surface 124*c* connected to the inclined locking surface 124*b* (FIG. 16, FIG. 17, and FIG. 21). The inclined surface 124*c* is formed as an inclined surface that moves the hood locking protrusion 33*a* from the inclined locking surface 124*b* to gradually eliminate the flexural deformation of the first hood locking body 33 when the hood locking protrusion 33*a* climbs over the first hood locking protrusion body 124. Accordingly, when the male connector 1 and the female connector 2 are assembled, the inclined surface 124*c* is also used as an inclined surface for causing the hood locking protrusion 33*a* to climb over to the inclined locking surface 124*b* side while flexurally deforming the first hood locking body 33.

Figure 22:
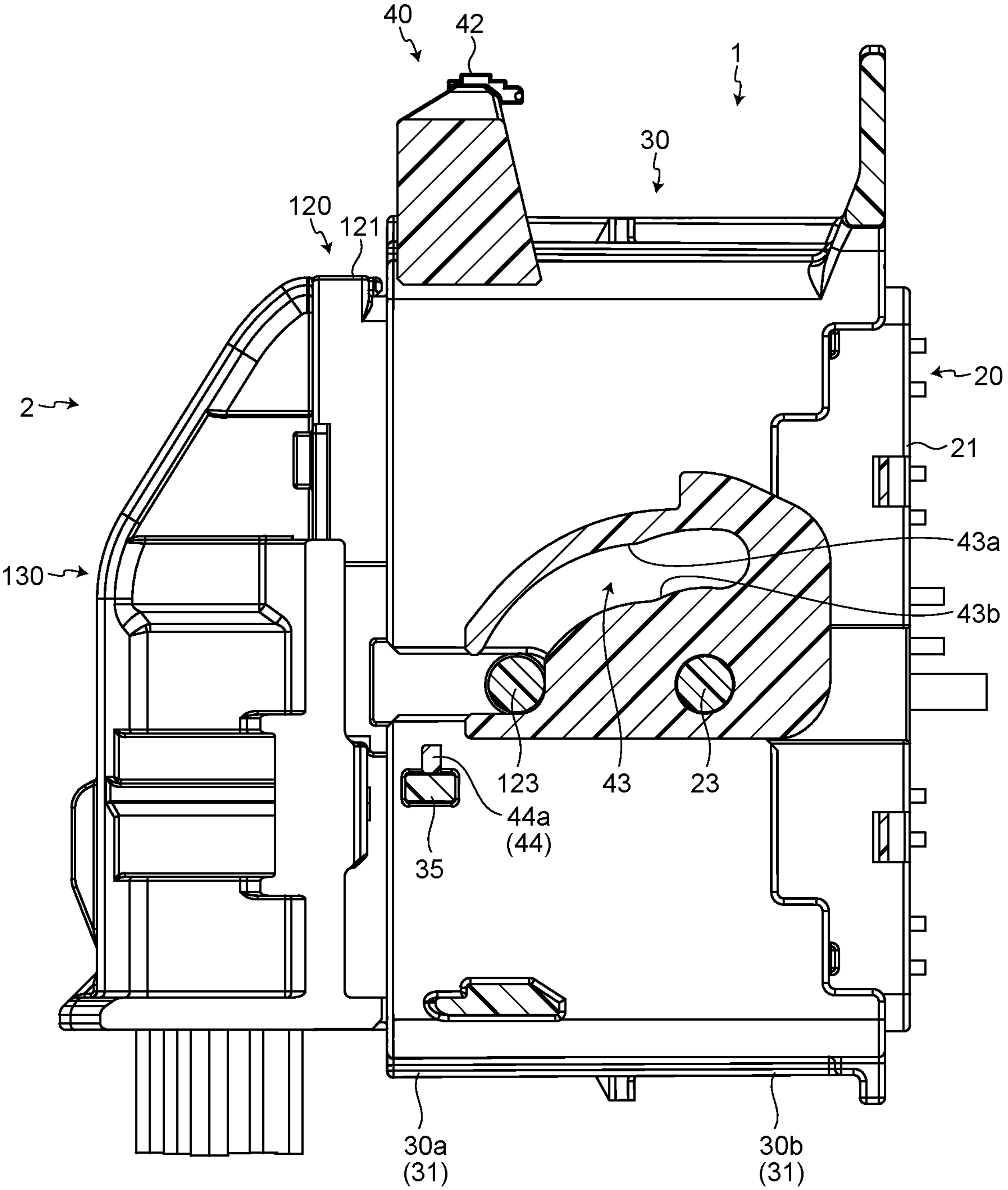
FIG. 22 is a sectional view taken along line X4-X4 in FIG. 2.

Note that the lever member 40 is temporarily locked to the hood member 30 in the first lever position. The hood member 30 includes a lever temporary locking protrusion body 35 projected from an outer wall surface of the hood member 30 (FIG. 6, FIG. 8, and FIG. 22) The lever member 40 includes a lever temporary locking body 44 that is provided in the arm portion 41 and locked to the lever temporary locking protrusion body 35 in the first lever position and suppresses turning to the second lever position (FIG. 6, FIG. 8, and FIG. 22). The lever temporary locking body 44 includes a lever temporary locking protrusion 44*a* that is locked to the lever temporary locking protrusion body 35 when the lever member 40 is in the first lever position, suppresses turning of the lever member 40 toward the second lever position, and stops the lever member 40 in the first lever position (FIG. 8 and FIG. 22). The lever temporary locking body 44 includes a lever temporary locking piece portion 44*b* that performs flexural deformation for enabling, when the lever member 40 is turned from the second lever position toward the first lever position, the lever temporary locking protrusion 44*a* to climbs over the lever temporary locking body 44 and, when the lever member 40 is turned from the first lever position toward the second lever position, the lever temporary locking protrusion 44*a* to climb over the lever temporary locking body 44 (FIG. 8). The lever temporary locking piece portion 44*b* is a cantilever piece portion provided in the arm portion 41. A lever temporary locking protrusion 44*a* is provided at a free end of the lever temporary locking piece portion 44*b*.

As explained above, in the fitting connector in the present embodiment, when the lever member 40 is turned from the first lever position to the second lever position, the plate locking body 22 is flexurally deformed by the input from the female connector 2 to release the locked state of the plate 32 by the plate locking body 22. In the fitting connector, the hood member 30 in the first hood position is relatively moved toward the second hood position by the input from the female connector 2. In the fitting connector in the present embodiment, when the lever member 40 is turned from the second lever position to the first lever position, the plate locking body 22 is flexurally deformed by the input from the female connector 2 and the hood member 30 in the second hood position is relatively moved toward the first hood position by the input from the female connector 2. As explained above, the fitting connector in the present embodiment relatively moves the hood member 30 using the input from the female connector 2 in order to maintain the relative movement function of the plate 32. Therefore, the fitting connector in the present embodiment can maintain a protection function of the male terminal metal fitting 10 by the plate 32.

Specifically, in the fitting connector in the present embodiment, when the lever member 40 is turned from the first lever position to the second lever position, the plate locking body 22 is flexurally deformed by a pressing force input from the plate unlocking portion 122 of the female connector 2 to the inclined surface of the first plate locking protrusion 22*a*, the locked state of the plate 32 by the plate locking body 22 is released, and the plate 32 in the first hood position is pushed and moved to the second hood position by the plate unlocking portion 122. In the fitting connector in the present embodiment, when the lever member 40 is turned from the second lever position to the first lever position, the plate locking body 22 is flexurally deformed by the pressing force input from the plate unlocking portion 122 of the female connector 2 to the inclined surface of the second plate locking protrusion 22*b*. In the fitting connector, when the lever member 40 is turned from the second lever position to the first lever position, the hood locking protrusion 33*a* of the first hood locking body 33 and the locking surface 124*a* of the first hood locking protrusion body 124 are locked to relatively move the hood member 30 (the plate 32) from the second hood position to the first hood position. As explained above, in the fitting connector in the present embodiment, the plate locking body 22 is flexurally deformed by the input from the plate unlocking portion 122 of the female connector 2. When the lever member 40 is turned from the first lever position to the second lever position, the fitting connector pushes and moves the hood member 30 (the plate 32) from the first hood position to the second hood position with the plate unlocking portion 122. When the lever member 40 is turned from the second lever position to the first lever position, the fitting connector locks the hood locking protrusion 33*a* of the first hood locking body 33 and the locking surface 124*a* of the first hood locking protrusion body 124 to relatively move the hood member 30 (the plate 32) from the second hood position to the first hood position. The fitting connector in the present embodiment utilizes the flexibility of the plate locking body 22 and can reduce the frictional resistance at the time of input from the female connector 2 to the plate locking body 22. Therefore, the durability of the plate locking body 22, the plate unlocking portion 122, and the like is high and thus the relative movement function of the plate 32 can be maintained.

In the fitting connector in the present embodiment, when the lever member 40 is in the first lever position, the hood locking protrusion 33*a* of the first hood locking body 33 and the inclined locking surface 124*b* of the first hood locking protrusion body 124 are locked until a pulling-apart force for separating the male connector 1 and the female connector 2 from each other is applied between the male connector 1 and the female connector 2 in the fitting completed position. In the fitting connector, the locked state between the hood locking protrusion 33*a* and the inclined locking surface 124*b* is released by the pulling-apart force being applied thereto. Therefore, the fitting connector in the present embodiment can prevent separation between the male connector 1 and the female connector 2 until a pulling-apart force intending separation is applied thereto.

In the fitting connector according to the present embodiment, when the lever member is turned from the first lever position to the second lever position, the plate locking body is flexurally deformed by the input from the female connector to release the locked state of the plate by the plate locking body. In the fitting connector, the hood member in the first hood position is relatively moved toward the second hood position by the input from the female connector. In the fitting connector according to the present embodiment, when the lever member is turned from the second lever position to the first lever position, the plate locking body is flexurally deformed by the input from the female connector and the hood member in the second hood position is relatively moved toward the first hood position by the input from the female connector. As explained above, the fitting connector according to the present embodiment relatively moves the hood member using the input from the female connector in order to maintain a relative movement function of the plate. Therefore, the fitting connector according to the present embodiment can maintain the protection function of the male terminal metal fitting by the plate.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A fitting connector comprising:

a male connector and a female connector that relatively move an interconnector between an insertable and removable position and a fitting completed position according to a turning operation of a lever member, wherein the male connector includes a male terminal metal fitting, a male frame member that houses the male terminal metal fitting while keeping a male terminal connecting portion protruded, a tubular hood member including a tubular hood portion that relatively moves the female connector in a tube axis direction between the insertable and removable position and the fitting completed position, the male frame member including a tubular frame housing portion that relatively moves the female connector in the tube axis direction between a first hood position in the insertable and removable position and a second hood position in the fitting completed position with respect to the male frame member, and the tubular hood member including a plate disposed in a boundary between the hood portion and the frame housing portion, and the lever member that is capable of turning around an axis of a rotating shaft between the lever member and the male frame member and causes a connector fitting force or a connector removal force involved in the turning to act between the lever member and the female connector, the plate includes a terminal insertion hole that allows a distal end of the male terminal connecting portion to enter the hood portion in the first hood position and increases a protrusion amount of the male terminal connecting portion in the hood portion to be larger in the second hood position than in the first hood position, the male frame member is provided with, in a plurality of parts, a plate locking body having flexibility for locking the plate in the first hood position, the plate locking body includes a first plate locking protrusion and a second plate locking protrusion that sandwich an end portion of the plate in a plate thickness direction thereof when the hood member is in the first hood position, the female connector includes a female terminal metal fitting including a female terminal connecting portion to which the male terminal connecting portion is fitted and connected in the fitting completed position and a female frame member that houses the female terminal metal fitting, the female frame member includes a guide shaft that receives the connector fitting force or the connector removal force from the lever member and a plate unlocking portion for releasing a locked state of the end portion of the plate by the plate locking body, and the lever member is turned in one direction around the axis of the rotating shaft with respect to the male frame member from a first lever position in the insertable and removable position toward a second lever position in the fitting completed position to cause the connector fitting force to act between the male frame member and the female connector, flexurally deform the plate locking body with input from the female connector brought close to the male frame member by the connector fitting force to release a locked state of the plate by the plate locking body, and push and relatively move the hood member in the first hood position toward the second hood position with the input from the female connector, and, on the other hand, is turned in another direction from the second lever position toward the first lever position around the axis of the rotating shaft with respect to the male frame member to cause the connector removal force to act between the male frame member and the female connector, flexurally deform the plate locking body with the input from the female connector pulled apart from the male frame member by the connector removal force, and relatively move the hood member in the second hood position toward the first hood position with the input from the female connector.

2. The fitting connector according to claim 1, wherein when the hood member is in the first hood position, the first plate locking protrusion is disposed in the hood portion and the second plate locking protrusion is disposed in the frame housing portion, and when the lever member is turned from the first lever position toward the second lever position, the plate unlocking portion flexurally deforms the plate locking body while pushing an inclined surface of the first plate locking protrusion with the connector fitting force received via the guide shaft to thereby cause the plate unlocking portion to climb over the first plate locking protrusion and climb over the second plate locking protrusion together with the plate while pushing the plate to relatively move the hood member from the first hood position to the second hood position.

3. The fitting connector according to claim 2, wherein when the lever member is turned to a third lever position from the second lever position toward the first lever position and the lever member is further turned to a fourth lever position from the third lever position toward the first lever position, the plate unlocking portion flexurally deforms the plate locking body while pushing an inclined surface of the second plate locking protrusion with the connector removal force received via the guide shaft to thereby climb over the first plate locking protrusion and the second plate locking protrusion, the female frame member includes a hood locking protrusion body that is projected from an outer wall surface and locks a hood locking body having flexibility in the hood member, and the hood locking protrusion body has a locking surface that locks a hood locking protrusion of the hood locking body in the second hood position and locks movement in a separating direction between the hood member and the female frame member directed from the fitting completed position to the insertable and removable position and, when the lever member is turned from the second lever position to the fourth lever position, continuously locks the hood locking protrusion on the locking surface until the plate climbs over the second plate locking protrusion of the flexurally deformed plate locking body to thereby relatively move the hood member from the second hood position toward the first hood position.

4. The fitting connector according to claim 3, wherein a first hood locking protrusion body functioning as the hood locking protrusion body is provided with an inclined locking surface connected to the locking surface, the hood member is provided with a second hood locking body besides a first hood locking body functioning as the hood locking body, the male frame member is provided with a second hood locking protrusion that locks the second hood locking body of the hood member when the lever member is turned from the second lever position to reach the fourth lever position and keeps the second hood locking body locked to stop the hood member in the first hood position when the lever member is turned from the fourth lever position to the first lever position, the locking surface of the first hood locking protrusion body is formed as an inclined surface that flexurally deforms the first hood locking body with force caused to act on the hood locking protrusion to cause the hood locking protrusion to climb on the inclined locking surface when the lever member is turned from the fourth lever position toward the first lever position, and the inclined locking surface is formed as an inclined surface that locks the hood locking protrusion until a pulling-apart force for separating the male connector and the female connector from each other is applied between the male connector and the female connector in the fitting completed position and further flexurally deforms the first hood locking body with force caused to act on the hood locking protrusion and causes the hood locking protrusion to climb over the first hood locking protrusion body when the pulling-apart force is applied between the male connector and the female connector.

* * * * *